(12) United States Patent
Yuhas et al.

(10) Patent No.: US 8,256,953 B2
(45) Date of Patent: Sep. 4, 2012

(54) METHODS AND APPARATUS FOR MEASURING TEMPERATURE AND HEAT FLUX IN A MATERIAL USING ULTRASOUND

(76) Inventors: Donald E. Yuhas, Glen Ellyn, IL (US); Don G. Walker, Jr., Nashville, TN (US); Mark J. Mutton, DeKalb, IL (US)

( * ) Notice: Subject to any disclaimer, the term of this patent is extended or adjusted under 35 U.S.C. 154(b) by 668 days.

(21) Appl. No.: 12/262,758

(22) Filed: Oct. 31, 2008

(65) Prior Publication Data

US 2010/0111133 A1    May 6, 2010

(51) Int. Cl.
*G01K 17/00* (2006.01)
(52) U.S. Cl. ............................. 374/30; 374/29
(58) Field of Classification Search ............ 374/30, 374/29
See application file for complete search history.

(56) References Cited

U.S. PATENT DOCUMENTS

| | | | |
|---|---|---|---|
| 2,829,185 A | 4/1958 | Macatician et al. | |
| 3,231,387 A | 1/1966 | Tsuchiya et al. | |
| 3,504,532 A * | 4/1970 | Adler et al. | 73/579 |
| 3,554,016 A | 1/1971 | Brech | |
| 3,566,676 A | 3/1971 | Hays | |
| 3,618,455 A | 11/1971 | Plumer et al. | |
| 3,921,499 A | 11/1975 | Ginsky | |
| 4,353,256 A | 10/1982 | Moorey | |
| 4,469,450 A * | 9/1984 | DiVincenzo | 374/119 |
| 4,513,749 A | 4/1985 | Kino et al. | |
| 4,541,732 A * | 9/1985 | Shah | 374/117 |
| 4,567,747 A | 2/1986 | Matay | |
| 4,765,750 A | 8/1988 | Wadley | |
| 4,848,924 A | 7/1989 | Nuspl et al. | |
| 5,016,474 A | 5/1991 | Hazony et al. | |
| 5,040,415 A * | 8/1991 | Barkhoudarian | 73/198 |
| 5,170,667 A | 12/1992 | Takeuchi et al. | |
| 5,182,139 A | 1/1993 | Frankel et al. | |
| 5,214,955 A | 6/1993 | Yost et al. | |
| 5,293,131 A | 3/1994 | Semones et al. | |
| 5,347,909 A | 9/1994 | Kozlik | |
| 5,369,600 A | 11/1994 | Ito et al. | |
| 5,469,742 A | 11/1995 | Lee et al. | |
| 5,557,970 A | 9/1996 | Abbate et al. | |
| 5,639,972 A | 6/1997 | Hastings et al. | |

(Continued)

FOREIGN PATENT DOCUMENTS

GB    2 328 498    2/1999

(Continued)

OTHER PUBLICATIONS

M.R. Myers, D.G. Walker, D.E. Yuhas and M.J. Mutton, "Heat Flux Determination from Ultrasonic Pulse Measurements," IMECE, Boston, Massachusetts, Nov. 2008, (pp. 1-5).

(Continued)

*Primary Examiner* — Christopher Fulton
(74) *Attorney, Agent, or Firm* — Hanley, Flight and Zimmerman, LLC

(57) ABSTRACT

Methods and apparatus for measuring heat flux in a material are disclosed. A disclosed example method involves emitting an acoustic signal into the material and determining a first propagation time associated with the propagation of the acoustic signal through the material. A first heat flux value indicative of a first heat flux of the material is then determined based on the first propagation time.

70 Claims, 17 Drawing Sheets

U.S. PATENT DOCUMENTS

| | | | |
|---|---|---|---|
| 5,659,148 | A | 8/1997 | Isgen |
| 6,026,688 | A * | 2/2000 | Khuri-Yakub et al. ......... 73/597 |
| 6,378,372 | B1 | 4/2002 | Karr |
| 6,481,287 | B1 | 11/2002 | Ashworth et al. |
| 6,499,289 | B1 | 12/2002 | Bunker et al. |
| 6,536,945 | B2 | 3/2003 | Rolston |
| 6,587,213 | B1 | 7/2003 | Knight et al. |
| 6,815,701 | B2 | 11/2004 | Schlenkert et al. |
| 6,834,992 | B2 | 12/2004 | Draxton et al. |
| 6,837,109 | B2 | 1/2005 | Okuno et al. |
| 6,907,792 | B2 | 6/2005 | Ohnishi |
| 6,968,727 | B2 | 11/2005 | Kwun et al. |
| 7,069,169 | B2 | 6/2006 | Nakakita et al. |
| 7,404,671 | B2 | 7/2008 | Heyman et al. |
| 7,470,056 | B2 * | 12/2008 | Yuhas ............................... 374/7 |
| 7,726,875 | B2 * | 6/2010 | Yuhas ........................... 374/119 |
| 2002/0078752 | A1 | 6/2002 | Braunling et al. |
| 2003/0167909 | A1 | 9/2003 | Matter |
| 2004/0050176 | A1 | 3/2004 | Ohnishi |
| 2004/0136434 | A1 | 7/2004 | Langley |
| 2004/0211261 | A1 | 10/2004 | Prause |
| 2011/0090935 | A1 * | 4/2011 | Cuffe et al. ................... 374/117 |

FOREIGN PATENT DOCUMENTS

| | | |
|---|---|---|
| JP | 61038433 | 2/1986 |
| JP | 01203967 | 8/1989 |
| JP | 10127632 | 5/1998 |
| JP | 2001074567 | 3/2001 |

OTHER PUBLICATIONS

P. Schmidt, D.G. Walker, D. Yuhas, M. Mutton, "Thermal Measurement of Harsh Environments Using Indirect Acoustic Pyrometry," IMECE, Seattle, WA, Nov. 2007, (pp. 1-8).

Takahashi, Manabu; Ihara, Ikuo, "Ultrasonic Determination of Temperature Distribution in Thick Plates during Single Sided Heating," Modern Physics Letters B, vol. 22, Issue 11, 2008, (pp. 971-976).

M.I.T Computer Science and Artificial Intelligence Laboratory, "The Cricket Indoor Location System," retrieved from http://nms.lcs.mit.edu/projects/cricket/, Aug. 19, 2005, (7 pages).

Livengood et al., "Ultrasonic Temperature Measurement in Internal Combustion Engine Chamber," The Journal of the Acoustical Society of America, vol. 26, Issue 5, pp. 824-830, Sep. 1954.

Lu et al., "Acoustic Computer Tomographic Pyrometry for Two-Dimensional Measurement of Gases Taking Into Account the Effect of Refraction of Sound Wave Paths," Meas. Sci. Technol., U.K., vol. 11, Issue 6, pp. 692-697, IOP Publishing Ltd., Jun. 2000.

Liao et al., "A New Ultrasonic Temperature Measurement System for Air Conditioners in Automobiles," Meas. Sci. Technol., vol. 15, Issue 2, pp. 413-419, Institute of Physics Publishing, U.K., Dec. 19, 2003.

Tsai et al., "An Ultrasonic Air Temperature Measurement System with Self-Correction Function for Humidity," Meas. Sci. Technol., vol. 16, Issue 2, pp. 548-555, Institute of Physics Publishing, U.K., Jan. 21, 2005.

Hoyle et al., "Ultrasound in the Process Industries," Engineering Science and Education Journal, vol. 3, Issue 3, Jun. 1994, (pp. 119-122).

Yee et al. "Application of Ultrasound to NDE of Materials," IEEE Transactions on Sonics and Ultrasonics, vol. SU-23, Issue 5, IEEE Sep. 1976, (pp. 299-305).

Liu, John M., "Temperature Dependence of Elastic Stiffness in Aluminum Alloys Measure with Non-Contact Electromagnetic Acoustic Transducers (Emats)," 1984 Ultrasonics Symposium, IEEE 1984, (pp. 972-974).

Duncombe, Edward, "Some Instrumental Techniques for Hostile Environments," J. Phys. E: Sci. Instrum., vol. 17, The Institute of Physics, 1984, (pp. 7-18).

Mi et al., "Automatic Ultrasonic Thermometry," 2003 Fifteenth Symposium on Thermophysical Properties, Boulder, CO, USA, Jun. 22, 2003, (9 pages).

Carnevale et al., "Experimental Determination of Transport Properties of High Temperature Gases," NASA CR-789, National Aeronautics and Space Administration, Washington, D.C., USA, Jun. 1967, (124 pages).

Chen, G., "Phonon Wave Heat Conduction in Thin Films and Superlattices," Journal of Heat Transfer, vol. 121, Nov. 1999, (pp. 945-953).

Fife, S., Andereck, C.D., and Rahal, S., "Ultrasound Thermometry in Transparent and Opaque Fluids," Experiments in Fluids, 35, 2003, (pp. 152-158).

Wadley, H.N.G., Norton, S. J., Mauer, F., Droney, B., Ash, E.A., and Sayers, C.M., "Ultrasonic Measurement of Internal Temperature Distribution," Philosophical Transactions of the Royal Society of London, Series A, Mathematical and Physical Sciences, 320 (1554), Nov. 1986, (pp. 341-361).

Green, S.F., "An Acoustic Technique for Rapid Temperature Distribution Measurements," Journal of the Acoustical Society of America, 77(2), Feb. 1985, ( pp. 759-763).

Baharis, C., and Cornish, R., 1991. "Ultrasonic Detection of Heat Fronts in Continuously Cast Steel Product," IEEE, In Proceedings of the Ultrasonics Symposium, vol. 2, (pp. 957-960).

Johnston, I.A., "Understanding and Predicting Gun Barrel Erosion," Tech. Rep. DTSO-TR-1757, Australian Government Department of Defense, Aug. 2005, (48 pages).

Berryman, J.G., "Stable Iterative Reconstruction Alogrithm for Nonlinear Traveltime Tomography," Inverse Problems, University of California, 1990, (pp. 21-42).

Maass-Moreno et al., "Noninvasive temperature estimation in tissue via ultrasound echo-shifts. Part I. Analytical model," Accoustical Society of America, Oct. 1, 1996, 8 pages.

Seip et al., "Noninvasive Estimation of Tissue Temperature Response to Heating Fields Using Diagnostic Ultrasound," IEEE Transactions on Biomedical Engineering, Aug. 8, 1995, 12 pages.

Simon et al., "Two-Dimensional Temperature Estimation Using Diagnostic Ultrasound," IEEE Transactions on Ultrasonics, Ferroelectrics, and Frequency Control, Jul. 4, 1998, 12 pages.

Kidd et al., "New Techniques for Transient Heat-Transfer Measurements in Hypersonic Flow at the AEDC," 37th AIAA Aerospace Sciences Meting & Exhibit, Reno, Nevada, Jan. 11-14, 1999, 27 pages.

Walker et al., "A New Technique for Heat Flux Determination," Proceedings of HT'03, 2003 Summer Heat Transfer Conference, Las Vegas, Nevada, Jul. 21-23, 7 pages.

Piccini et al., "The Development of a New Direct-Heat-Flux Gauge for Heat-Transfer Facilities," Meas. Sci. Technol. 11 (2000), pp. 342-349.

Buttsworth et al., "Radial Conduction Effects in Transient Heat Transfer Experiments," The Aeronautical Journal of the Royal Aeronautical Society, May 1997, 5 pages.

Ireland et al., "Liquid Crystal Measurements of Heat Transfer and Surface Shear Stress," Meas. Sci. Technol. 11 (2000), pp. 969-986.

Newton et al., "Transient Heat Transfer Measurements Using Thermochromic Liquid Crystal. Part 1: An Improved Technique," International Journal of Heat Fluid Flow 24 (2003), pp. 14-22.

Guo et al., "The Application of Thin-Film Technology to Measure Turbine-Vane Heat Transfer and Effectiveness in a Film-Cooled, Engine-Simulated Environment," International Journal of Heat and Fluid Flow 19 (1998), pp. 594-600.

Walker et al., "Evaluation of Estimation Methods for High Unsteady Heat Fluxes from Surface Measurements," Journal of Thermophysics and Heat Transfer, vol. 12, No. 4, Oct.-Dec. 1998, pp. 543-551.

Walker et al., "Estimation Methods for Two-Dimensional Conduction Effects of Shock-Shock Heat Fluxes," Journal of Thermophysics and Heat Transfer, vol. 14, No. 4, Oct.-Dec. 2000, pp. 533-539.

Cook, W.J., "Determination of Heat-Transfer Rates from Transient Surface Temperature Measurements," AIAA Journal, vol. 8, No. 7, pp. 1366-1368.

Walker et al., "Transient Measurements Using Thermographic Phosphors," Jan. 22, 2007, ISA Transactions 46 (2007), pp. 15-20.

Walker, D.G., "Heat Flux Determination From Measured Heating Rates Using Thermographic Phosphors," Transactions of ASME, Journal of Heat Transfer, vol. 127, Jun. 2005, pp. 560-570.

Bezuidenhout et al. "Heat Flux Determination Using Surface and Backface Temperature Histories and Inverse Methods," 37th AIAA/ASME/SAE/ASEE Joint Propulsion Conference & Exhibit, Jul. 8-11, 2011, Salt Lake City, Utah, 12 pages.

Walker et al., "The Effects of Lateral Conduction on Heat Flux Estimation From Surface Temperature Measurements," AIAA/ASME Joint Thermophysics and Heat Transfer Conference, vol. 3, 1998, pp. 245-252.

\* cited by examiner

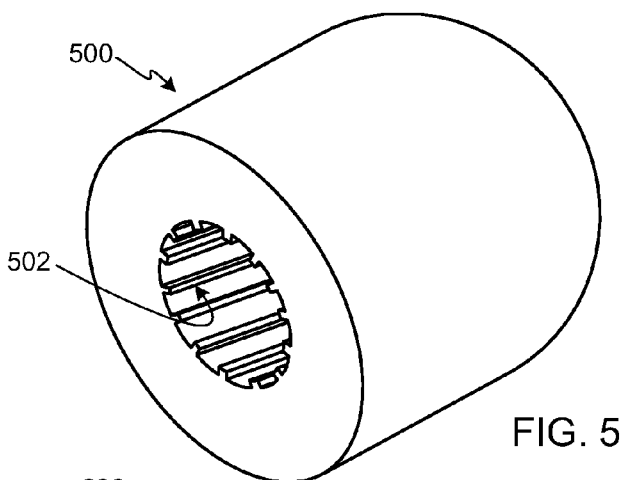
FIG. 5
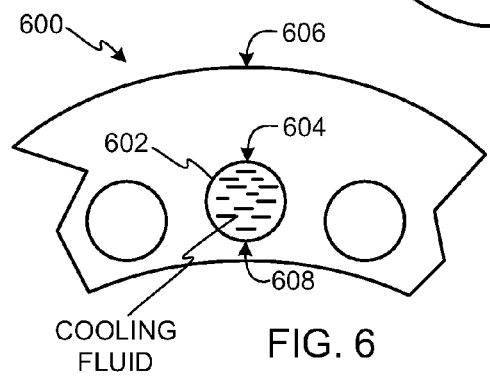
FIG. 6
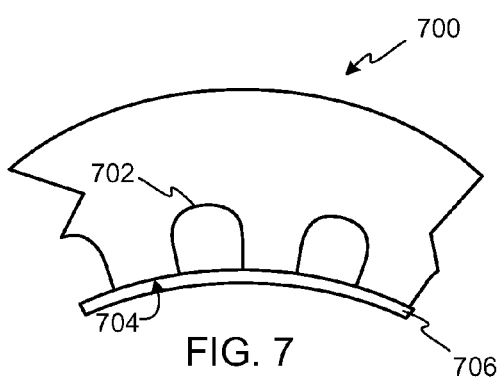
FIG. 7
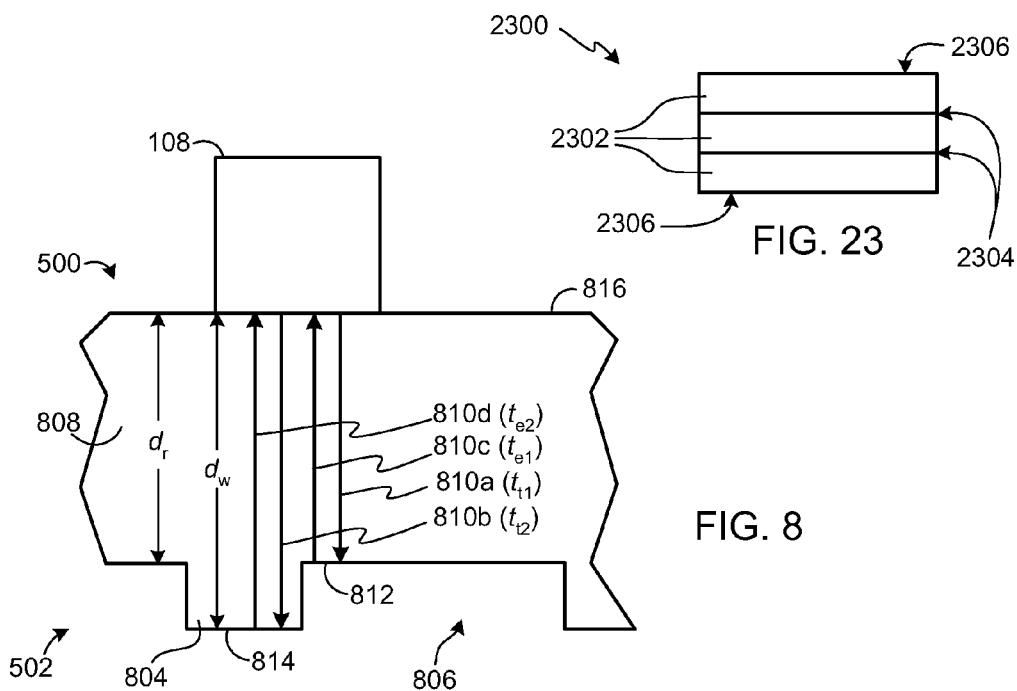
FIG. 23
FIG. 8

| PROPERTY | VALUE |
| --- | --- |
| MATERIAL DENSITY ($\rho$) | 7833 kg/m$^3$ |
| THERMAL CONDUCTIVITY ($k$) | 44.5 W/mK |
| SPECIFIC HEAT CAPACITY ($C_p$) | 475 J/kgK |
| BASE ACOUSTIC VELOCITY ($c$) | 509.5 m/s |
| ACOUSTIC VELOCITY COEFFICIENT ($P$) | 55 x 10$^{-6}$ K$^{-1}$ |
| WALL THICKNESS ($L$) | 0.0635 m |

MATERIAL PROPERTIES OF NAVAL SHIP GUN BARREL

FIG. 10

SIMULATED COMPARISON BETWEEN ULTRASONIC DERIVED HEAT FLUX AND A PRESCRIBED BOUNDARY HEAT FLUX

THRESHOLD FOR MATERIAL THICKNESS TO JUSTIFY A ZERO EXTERIOR BOUNDARY HEAT FLUX ASSUMPTION

ERROR BASED ON ULTRASONIC-BASED HEAT FLUX DETERMINATION

ULTRASONIC-BASED HEAT FLUX vs. PRESCRIBED HEAT FLUX

METHODS AND APPARATUS FOR MEASURING TEMPERATURE AND HEAT FLUX IN A MATERIAL USING ULTRASOUND

GOVERNMENT CONTRACT

This patent discloses subject matter developed with Government support under contract numbers FA8650-07-M-3725 and FA9550-06-C-0071 awarded by the United States Air Force to Industrial Measurement Systems, Incorporated. The Government has certain rights in this patent.

FIELD OF THE DISCLOSURE

The present disclosure relates generally to monitoring a material condition and, more particularly, to methods and apparatus for measuring temperature and heat flux in a material using ultrasound.

BACKGROUND

Monitoring operating conditions in commercial or industrial applications is often crucial to maintaining proper and safe operation of machinery. Material temperature can affect the performance of machines, apparatus, or systems. Continuous operation or repeated use often elevates the temperature of machines or apparatus, and uncontrolled or overly elevated temperatures may impair their operation.

The military has similar concerns as those of commercial or industrial entities regarding material conditions such as temperature. In particular, the military recognizes that operating conditions, such as temperature, affect the performance and the safe and proper operation of structures subject to extreme temperature variations. Such structures include outer body surfaces of high-speed vehicles and inner surfaces of chambered structures. For example, an outer structure of a vehicle in hypersonic flight will undergo surface temperature changes due to frictional heating when traveling at high Mach numbers. A chambered structure that can undergo extreme temperature changes is a combustion chamber of a liquid rocket motor. In either case, the structures are virtually inaccessible for direct temperature measurements during operation.

BRIEF DESCRIPTION OF THE DRAWINGS

FIG. 5 is an isometric view of a gun barrel having rifling features on an inner bore surface.

FIG. 6 is a partial view of a structural wall having passageways formed therethrough and fluid flowing through the passageways.

FIG. 7 is a partial view of another structural wall having passageways formed therein.

FIG. 8 is a partial view of a gun barrel wall of the gun barrel of FIG. 5.

FIG. 10 illustrates a table showing the material properties of a naval ship gun barrel used to predict heat flux measurements based on ultrasonic measurements.

FIG. 23 shows a material wall formed using a plurality of material layers having material interfaces therebetween and surface boundaries.

DETAILED DESCRIPTION

Figure 1:
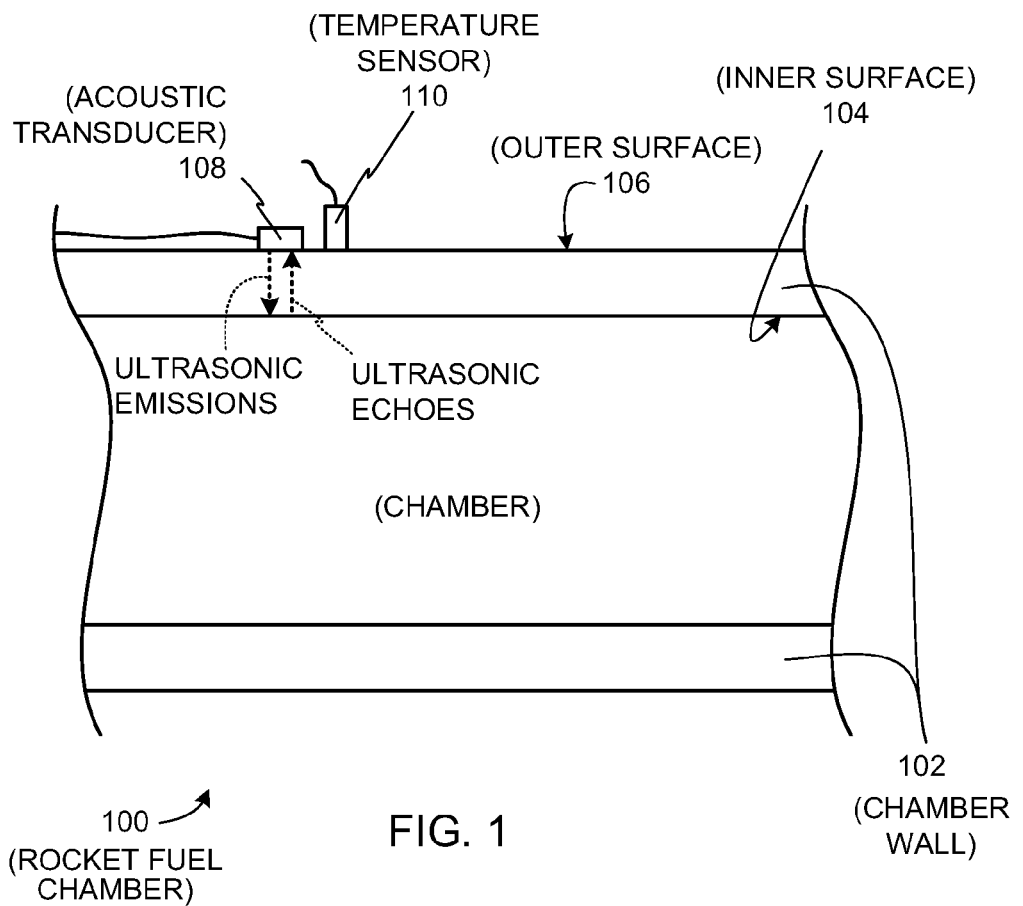
FIG. 1 illustrates a chamber wall housing of an example rocket fuel chamber.

Although the following discloses example systems including, among other components, software executed on hardware, it should be noted that such systems are merely illustrative and should not be considered as limiting. For example, it is contemplated that any or all of these hardware and software components could be embodied exclusively in hardware, exclusively in software, or in any combination of hardware and software. Accordingly, while the following describes example systems, persons having ordinary skill in the art will readily appreciate that the examples provided are not the only way to implement such systems.

In general, the example methods and apparatus described herein may be used to monitor local temperatures and heat fluxes of structural features that are relatively inaccessible during operation using acoustic measurement techniques (e.g., ultrasonic measurement techniques). Structures used in connection with harsh thermal or chemically reacting environments typically undergo extreme heat variations. The performance and integrity of such structures can often depend on the temperature levels achieved, the magnitudes of temperature changes in those structures, and the speed at which temperatures change. For example, one such structure that can undergo extreme temperature changes is a combustion chamber of a liquid rocket motor. The inner wall surface of the chamber containing rocket fuel is virtually inaccessible for direct temperature measurements during operation. In another example, an inner bore surface of a large caliber gun barrel such as those mounted on naval ships is relatively inaccessible during operation as multiple firings induce temperature elevations in the gun barrel wall. In another example, an outer structure of a vehicle in hypersonic flight will undergo surface temperature changes due to frictional heating when traveling at high Mach numbers. In all of these examples and other structures, the proposed methods and apparatus can be used to determine heat flux variations in those structures using ultrasonic signals without direct physical or optical access to the surfaces being measured.

As discussed in greater detail below, a monitoring apparatus may be mounted to a relatively accessible wall or surface of a structure to measure portions of that structure that are relatively non-accessible during operation of that structure. Although the example methods and apparatus described herein may be more generally applied to measure many different types of inaccessible portions of structures, the example methods and apparatus are described below with respect to liquid-storage chambers such as combustion chambers and gun barrels such as those used in naval ship weapon systems.

The example methods and apparatus may be implemented using any acoustic technology capable of propagating an acoustic signal through a solid material such as, for example, steel. Ultrasound is an example acoustic measurement technology that is capable of transmitting compressional wave signals and shear wave signals through a solid material. A compressional wave (i.e., a longitudinal wave, a P-wave) propagates through a material by displacing particles in a direction parallel to the direction in which the compressional wave propagates. A shear wave (i.e., a transverse wave, an S-wave) propagates through a material by displacing particles in a direction perpendicular to the direction in which the shear wave propagates. An example temperature monitoring system (e.g., the example temperature monitoring system 200 of FIG. 2) is configured to emit acoustic signals (e.g., ultrasonic waves) into a structure and receive echoes associated with the acoustic signals after the acoustic signals are reflected by one or more features of the structure. The example system determines propagation times associated with the propagation of the acoustic signal and then determines one or more local temperatures and heat fluxes associated with one or more portions of the structure based on the propagation times.

Referring to FIG. 1, a chamber wall housing of an example rocket fuel chamber 100 is formed using a chamber wall 102 having an inner (inaccessible) surface 104 and an outer (accessible) surface 106. The inner surface 104 engages the liquid rocket fuel housed by the fuel chamber 100 and undergoes relatively high temperature changes during combustion of the fuel. To measure local temperatures and heat fluxes in the chamber wall 102, an acoustic transducer 108 and a temperature sensor 110 are mounted on the outer surface 106 of the chamber wall 102. The temperature sensor 110 is used to measure the temperature of the outer surface 106, while the acoustic transducer 108 is used to emit ultrasonic signals into the chamber wall 102 and detect reflections of those ultrasonic signals caused by distal surfaces or features such as the distal inner surface 104 relative to the acoustic transducer 108.

In some example implementations described herein, a heat flux in the chamber wall 102 can be determined using a thermal model and inverse methods based on a calculated local temperature of the inner surface 104. The ultrasonic signal reflections caused by the inner surface 104 can be used to determine a local temperature of the inner surface 104 without requiring a separate temperature sensor physically mounted to the inner surface 104. Using high frequency ultrasonic measurements for repetitive measurements of the inner surface temperatures, the determined local temperatures of the inner surface 104 can, in turn, be used in connection with the thermal model and inverse methods to determine heat fluxes within the chamber wall 102 between the outer and inner surfaces 104 and 106.

In other example implementations described herein, heat fluxes in a measured medium (e.g., the chamber wall 102) can be directly calculated from the propagation times of the acoustic signals emitted into the measured mediums without requiring local temperature calculations, a thermal model, and inverse techniques.

Although FIG. 1 illustrates the inner inaccessible surface 104, the example methods and apparatus could be adapted for use with an outer inaccessible surface or any other relatively inaccessible feature, in which case an acoustic transducer and a temperature sensor can be mounted to an inner accessible surface or any other accessible feature. In addition, although the acoustic transducer 108 and temperature sensor 110 are arranged in FIG. 1 in a non-destructive testing configuration, they could alternatively be arranged or embedded within the chamber wall 102 by forming recesses on the outer surface 106 and inserting the acoustic transducer 108 and the temperature sensor 110 in the recesses.

Although one acoustic transducer and one temperature sensor are shown, more acoustic transducers and temperature sensors may be used. For example, each pair of acoustic transducer and temperature sensor may be located at different positions on the outer surface 106 to measure local temperatures and heat fluxes at different locations of the rocket fuel chamber 100.

Figure 2:
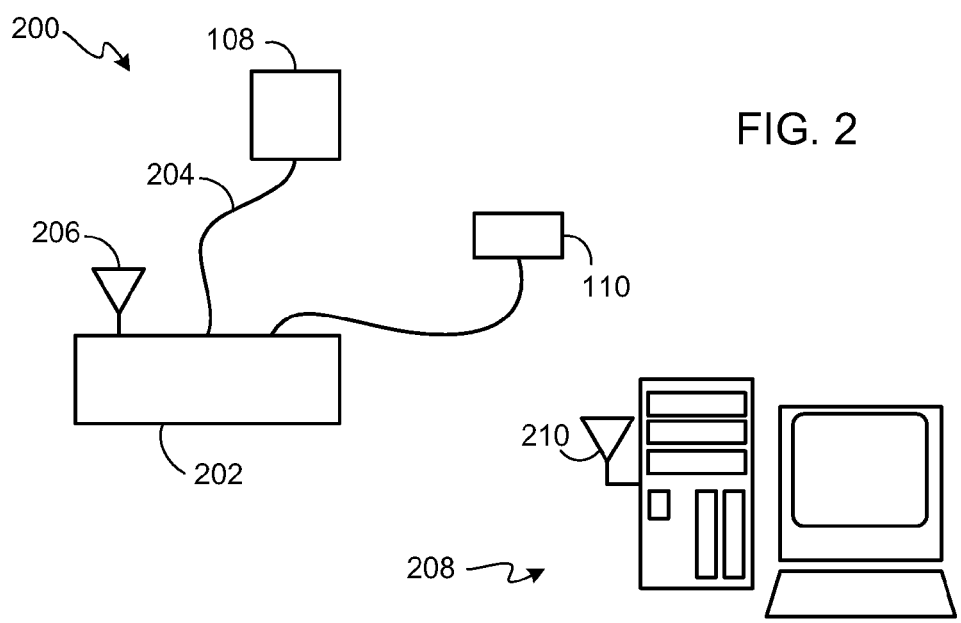
FIG. 2 illustrates a detailed diagram of an example temperature monitoring system.

FIG. 2 illustrates a detailed diagram of an example temperature monitoring system 200. As shown, the transducer 108 is communicatively coupled to a base system 202 via a wire or cable 204. The base system 202 may be used to control the emission and reception of signals associated with the transducer 108 via the wire 202. For example, the base system 202 may control the triggering or emission timing of the acoustic transducers 108 so that the acoustic transducer 108 can emit acoustic signals (e.g., ultrasound signals or waves) into the chamber wall 102 and subsequently detect echoes associated with the emitted acoustic signals. Specifically, the base system 202 may generate an electrical signal having a specified frequency (e.g., an ultrasonic frequency), communicate via the wire 204 the electrical signal to the acoustic transducers 108, which then emits an acoustic signal into the chamber wall 102 based on the electrical signal. The acoustic transducer 108 can subsequently detect acoustic echoes caused by one or more structural features (e.g., the inner surface 106) of the chamber wall 102 based on the emitted acoustic signal, convert the echoes into electrical signals, and communicate the electrical signals to the base system 202 via the wires 204.

The base system 202 may include a processor system (e.g., the processor system 2810 of FIG. 28) and/or a dedicated hardware system and may be configured to obtain information associated with acoustic signal emissions into portions of the gun barrel chamber wall 102 (FIG. 1) that are then used to monitor local temperatures and heat fluxes of the chamber wall 102. The temperature sensor 110 may be implemented using any suitable temperature transducer such as, for example, a thermocouple, an infrared temperature sensor, etc. The acoustic transducer 108 may be implemented using a transducer configured to emit and receive ultrasonic signals. For example, the acoustic transducer 108 may be implemented using a piezoelectric transducer, which is a common type of ultrasonic transducer. Piezoelectric transducers operate based on the piezoelectric effect which has bi-directional electrical field generation properties. More specifically, a varying voltage applied across a plate or disc may generate an ultrasonic field. Conversely, an ultrasonic pulse impinging on a piezoelectric crystal will result in a voltage or an electrical charge being generated across the surface of the plate or disc. Alternate methods for generating and receiving the ultrasonic signals can also be used including electromagnetic acoustic transducers, capacitive transducers, and laser generation and detection.

Ultrasound includes frequencies in the megahertz (MHz) range. To reduce or substantially eliminate attenuation of ultrasound signals, piezoelectric transducers are typically directly coupled to a surface (e.g., the outer surface 106 of the rocket fuel chamber 100). A piezoelectric transducer may be directly bonded to the surface by, for example, welding the transducer to the surface, bonding the transducer to the surface using epoxy or other means, integrally forming the transducer with the surface, etc. Alternatively, a piezoelectric transducer may be coupled to the surface via a coupling fluid (e.g., water, glycerin, or any other suitable high temperature coupling material) by disposing the coupling fluid between the piezoelectric transducer and the surface. In this manner, any air gaps or air pockets between the piezoelectric transducer and the surface are minimized or substantially eliminated.

In some example implementations, the acoustic transducer 108 may alternatively be implemented using non-contact ultrasonic technologies. Some example non-contact ultrasonic technologies include laser generation devices, Electromagnetic Acoustic Transduction (EMAT) devices, and spark gap devices. Some non-contact ultrasonic technologies include separate or discrete transmitters and receivers. Non-contact ultrasonic receivers include interferometers for use with laser generation devices, capacitive receivers, and EMAT receivers. Even though the signal processing to extract or determine timing information (e.g., the propagation times) associated with the emission and reception of ultrasonic signals may be different for each ultrasonic technology, the example methods and apparatus described herein may be adapted accordingly.

Implementing the example methods and apparatus for use in significantly high temperatures may require operating piezoelectric sources under conditions that exceed their specified temperature limits. In piezoelectric ceramics the Curie temperature can range from 300° F. to 1000° F. If the example methods and apparatus are implemented for use at significantly high temperatures, the acoustic transducer 108 may be implemented using high temperature piezoelectric crystals such as quartz, lithium, niobate, tourmaline, langesites, etc. Additionally, piezoelectric transducers can by thermally isolated and/or implemented in combination with buffers or delay lines as is commonly practiced by those skilled in the art of high temperature ultrasonic testing.

As shown in FIG. 2, the base system 202 includes an antenna 206. The antenna 206 may be used to communicate information between the base system 202 and a processing system 208 having another antenna 210. The antennas 206 and 210 enable the base system 202 to be wirelessly communicatively coupled to the processing system 208 using any suitable wireless protocol such as, for example, IEEE 802.11 (i.e., Wi-Fi®), Bluetooth®, 900 MHz, etc. Alternatively, although not shown, the base system 202 may be communicatively coupled via a cable or a wire to the processing system 208 or any other processing system (e.g., a rocket control system, a vehicle control system, a gun control system, etc.).

In an example implementation, the base system 202 may be configured to perform all signal processing operations associated with the acoustic signals to determine temperature and heat flux measurements. The base system 202 may also store all of the resultant values in a locally stored database and periodically or immediately communicate the values to the processing system 208. In this manner, temperature and heat flux information may be readily obtained via the processing system 208. In some example implementations, the processing system 208 may be integral or communicatively coupled with another control system (e.g., a rocket control system, a vehicle control system, etc.). The processing system 208 may generate historical databases that may be used to perform long-term analysis of the rocket fuel chamber 100 for purposes of, for example, performance analysis, maintenance analysis, replacement analysis, etc. The processing system 208 may be implemented using the example processor system 2810 of FIG. 28.

Figure 3:
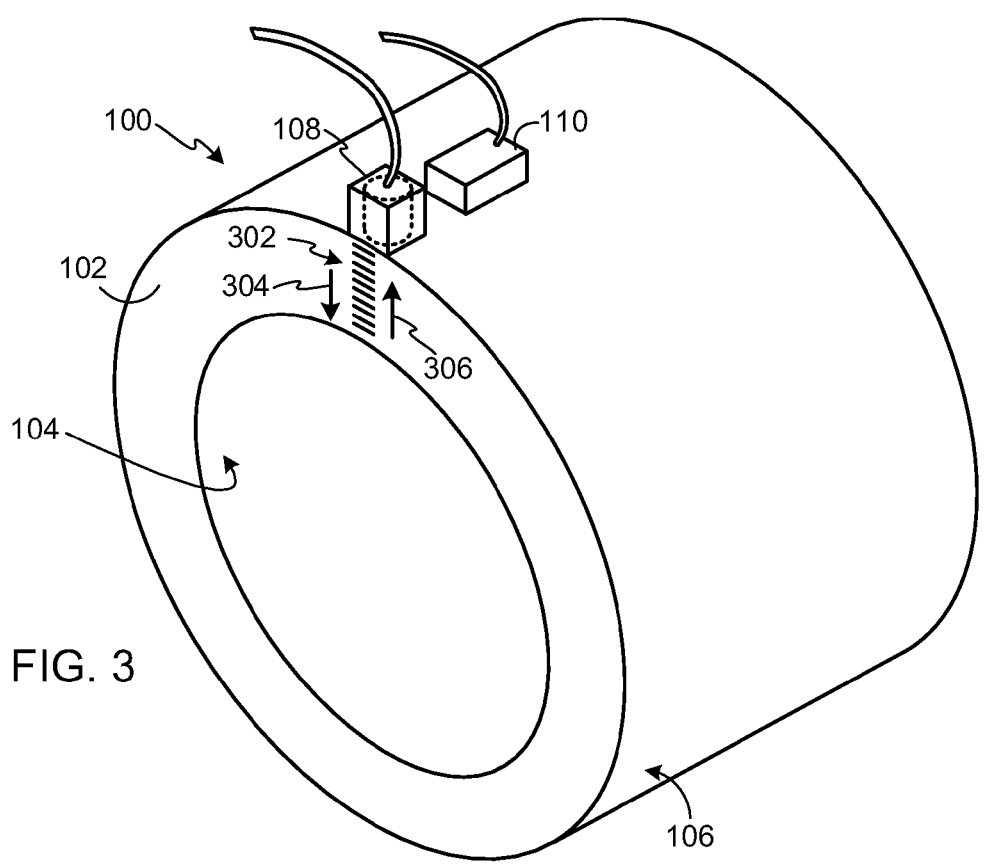
FIG. 3 is a partial isometrical view of the rocket fuel chamber of FIG. 1.

FIG. 3 illustrates the acoustic transducer 108 and the temperature sensor 110 mounted to the outer surface 106 of the rocket fuel chamber 100 of FIG. 1. In general, FIG. 3 depicts how the acoustic transducer 108 may be used to emit acoustic signals 302 (e.g., an ultrasonic signal) into the chamber wall 102 and detect acoustic echoes associated with the acoustic signal 302. As shown in FIG. 3, the acoustic transducer 108 is configured to emit the acoustic signal 302 into the chamber wall 102 from the outer surface 106 toward the inner surface 104 in a direction generally indicated by arrow 304. The acoustic signal 302 is reflected by the inner surface 104 to produce one or more echoes that propagate toward the outer surface 106 in a direction generally indicated by arrow 306 and may be detected by the acoustic transducer 108. The acoustic transducer 108 may then convert the one or more echoes into electrical signals that are communicated to the base system 202 (FIG. 2).

Figure 4:
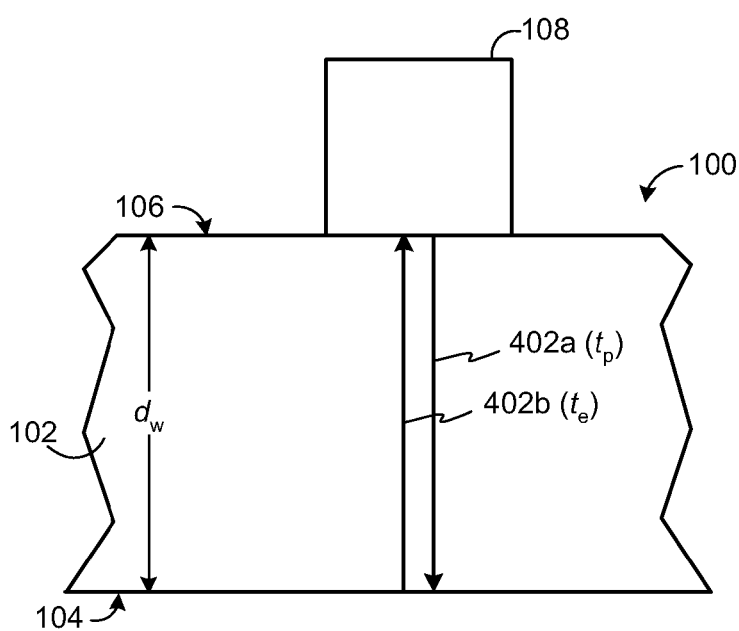
FIG. 4 is a partial view of the chamber wall of the rocket fuel chamber of FIGS. 1 and 2.

FIG. 4 is a partial view of the rocket fuel chamber 100 with the acoustic transducer 108 coupled thereto. Temperature and heat flux measurements of the chamber wall 102 are performed based on a plurality of different amounts of time required for the acoustic signals 302 and corresponding echoes to propagate through a wall depth or thickness $d_w$ of the chamber wall 102 over a duration during which the rocket fuel chamber 100 undergoes temperature changes due to, for example, fuel combustion. In operation, the acoustic transducer 108 emits the acoustic signals 302 into the chamber wall 102 so that the acoustic signals 302 propagate toward the inner surface 104 in a direction generally indicated by arrow 402a. An acoustic signal propagation time $t_p$ (or time-of-flight (TOF)) represents the amount of time required for one of the acoustic signals 304 to propagate from the outer surface 106 (or from the acoustic transducer 108) to the inner surface 104. The acoustic signal 302 is then reflected by the inner surface 104 to produce an echo. The echo propagates toward the acoustic transducer 108 in a direction generally indicated by arrow 402b. An echo propagation time $t_e$ represents the amount of time required for the echo signal to propagate from the inner surface 104 to the acoustic transducer 108.

In the illustrated example of FIG. 4, propagation time through the chamber wall 102 is defined as the amount of time required for one of the acoustic signals 302 to propagate from the outer surface 106 to the inner surface 104 and back to the outer surface 106 and is denoted herein as a wall propagation time $t_w$. The wall propagation time $t_w$ is determined based on the signal propagation time $t_p$ and the echo propagation time $t_e$ as shown in equation 1 below.

$$t_w = t_p + t_e \qquad \text{Equation 1}$$

As shown above in equation 1, the wall propagation time $t_w$ is equal to the sum of the times $t_p$ and $t_e$. Although the method of determining the wall propagation time $t_w$ is shown mathematically in equation 1 above with respect to the times $t_p$ and $t_e$, the wall propagation time may alternatively be determined based on timestamps (e.g., acoustic signal emission timestamps and echo detection timestamps).

The example methods and apparatus described herein can also be used to measure local temperatures and heat fluxes of structures having features formed therein including, for example, channels, tubular passages, layered material structures, etc. Gun barrel bores are example structures that have channeled surfaces formed by rifling structures formed along their inner surfaces. FIG. 5 shows an example gun barrel 500 having a rifled surface 502 formed along an inner surface defining its bore.

Walls of structures used in high-heat environments are sometimes provided with tubular passages formed therethrough to enable forcing cooling fluids adjacent high-heat surfaces to implement a cooling system that can be used to prevent overheating. Such cooling passages can be formed by drilling or molding passages along the length of a chamber wall. FIG. 6 illustrates an example structure 600 having molded or drilled passageways 602 formed therein. Referring to FIG. 7, cooling passageways or channels 702 can also be formed using a material layering process, which involves forming the channels 702 on a material surface 704 and coupling a secondary material layer 706 onto the channeled surface 704.

The example methods and apparatus described herein can be configured to determine local temperatures and heat fluxes of materials having channel and passageway features such as those shown in connection with FIGS. 5-7 based on propagation times of acoustic signals emitted into the materials. In some example implementations, the signal propagation times described herein and used to determine local temperatures and/or heat fluxes can be based on signal echoes caused by yet other features in measured mediums. Such features include material interfaces or material imperfections in otherwise solid mediums. For example, referring to FIG. 23, a material wall 2300 is shown as formed using a plurality of material layers 2302 having material layer interfaces 2304 therebetween and surface boundaries 2306. Signal propagation times can be determined for each material layer 2302 based on selected echo pairs associated with corresponding ones of the material layer interfaces 2304.

FIG. 8 shows an example acoustic measurement configuration that can be used to measure acoustic propagation times for the rifled gun barrel 500 of FIG. 5. Similar techniques can be used to measure acoustic propagation times for the passageway structures 600, 700, and 2300 of FIGS. 6, 7, and 23. As shown in FIG. 8, the acoustic transducer 108 is coupled to an outer surface 802 of the gun barrel 500 to emit acoustic signals toward a rifling element 804 and a recess 806 (e.g., a channel) adjacent to the rifling element 804 of the rifled surface 502. In the illustrated example, the acoustic transducer 108 emits acoustic signals that propagate in a wall 808 of the gun barrel 500 along directions generally indicated by arrows 810a and 810b and then detects acoustic echoes that travel along directions generally indicated by arrows 810c and 810d. In this manner, the temperature monitoring system 200 (FIG. 2) can determine propagation times associated with the acoustic signals to then determine local temperatures and heat fluxes in the wall 808 of the gun barrel 500.

Local temperatures can be determined in rifling elements (e.g., the rifling element 804 of FIG. 8) as described in U.S. patent application Ser. No. 11/056,431, filed Feb. 11, 2005, hereby incorporated herein by reference in its entirety. As described therein, the local temperatures of rifling elements are representative of surface temperatures at inner surfaces of gun barrel bores. In some example implementations described herein, local temperatures of non-accessible surfaces (e.g., the inner surface 104 of FIG. 1, gun barrel bore surfaces, outer surfaces of vehicles used for hypersonic flight, etc.), can be determined using a thermal model in association with inverse methods and propagation times of ultrasonic signals measured using relatively high measurement collection rates. In this manner, changes in local surface temperatures over time can be used to determine heat fluxes in regions associated to those local temperatures. Using relatively high temporal resolutions to collect repetitive propagation time measurements enables determining heat fluxes having relatively high accuracies and precisions. In the illustrated example of FIG. 2, a pulse repetition rate of an ultrasonic driver in the base system 202 can be configured to operate in the megahertz frequency range to attain measurement repetition rates of one MHz or more. Using a high-speed data acquisition unit in the base system 202, propagation times based on signal echoes can be collected at approximately once every microsecond.

To determine local temperatures and heat fluxes associated with relatively smooth inaccessible surfaces such as the inner surface 104 of FIGS. 1 and 4, propagation times associated with the inner surface 104 are used. To determine local temperatures and heat fluxes associated with rifling surfaces (e.g., the rifled surface 502 of FIG. 5) or other surfaces with other structural features such as, for example, the features shown in FIGS. 6, 7, and 23, propagation times associated with a selected feature surface are used. For example, referring to FIG. 8, local temperatures and heat fluxes in portions of the wall 808 of the gun barrel 500 can be determined based on echoes produced by a recess surface 812 formed by the recess 806 or an inner surface 814 (or land) that forms the rifling element 804. In the illustrated example, the recess surface 812 and the inner surface 814 are distal features or surfaces relative to the acoustic transducer 108.

In the illustrated example of FIG. 8, when the acoustic transducer 108 emits an acoustic signal into the wall 808, a portion of the acoustic signal propagates toward the recess surface 812 along the direction generally indicated by arrow 810a, and a portion of the acoustic signal propagates toward the inner surface 814 along the direction generally indicated by arrow 810b. When the acoustic signal is reflected from the recess surface 812 and the inner surface 814, two distinctly detectable echoes are produced. As shown in FIG. 8, a recess distance $d_r$ indicates the distance from the outer surface 816 to the recess surface 812, and a wall depth or thickness $d_w$ indicates the distance from the outer surface 816 to the inner surface 814. A first transmit time $t_{t1}$ represents the amount of time required for the acoustic signal to propagate from the outer surface 816 or the acoustic transducer 108 to the recess surface 812. A second transmit time $t_{t2}$ represents the amount of time required for the acoustic signal to propagate from the outer surface 816 or the acoustic transducer 108 to the inner surface 814.

After the acoustic signal propagates along the direction 810a, it is reflected by the recess surface 812, which produces a first echo signal that propagates toward the acoustic transducer 108 along the direction generally indicated by arrow 810c. A first echo time $t_{e1}$ represents the amount of time required for the first echo signal to propagate from the recess surface 812 to the acoustic transducer 108. After the acoustic signal propagates along the direction 810b, it is reflected by the inner surface 814, which produces a second echo signal that propagates along a direction generally indicated by arrow 810d toward the acoustic transducer 108. A second echo time $t_{e2}$ represents the amount of time required for the second echo signal to propagate from the inner surface 814 to the acoustic transducer 108. To determine local temperatures and/or heat fluxes as described herein, the temperature monitoring system 200 can be configured to measure propagation times associated with a single selected feature and base temperature and perform heat flux calculations based on those measured propagation times. For example, for a rifling surface such as the rifled surface 502 depicted in FIGS. 5 and 8, the temperature monitoring system 200 may be configured to measure propagation times based on echoes produced by the recess surface 812 and ignore or discard echoes produced by the inner surface 814. In this manner, the temperature monitoring system 200 can determine local surface temperatures of the recess surface 812 and subsequently determine a heat flux associated with the recess surface 812 or a portion of the wall 808 proximate the recess surface 812.

Although the example methods and apparatus are described herein in connection with determining local temperatures and/or heat fluxes in portions of materials such as the chamber wall 102 of FIGS. 1, 3, and 4 and the gun-barrel wall 808 forming the gun barrel 500 of FIGS. 5 and 8, the example methods and apparatus described herein can also be used to measure local temperatures and/or heat fluxes of materials contained in or flowing through the above-described structures. For example, the example methods and apparatus can be used to determine local temperatures and/or heat fluxes of cooling fluids flowing through the channels or passageways shown in FIGS. 6 and 7. This can be accomplished by selecting echo pairs reflected by features associated with those channels or passageways that are indicative of or related to the temperatures and heat fluxes generated in the cooling fluids. For example, referring to FIG. 6, the local temperature and/or heat flux of a fluid flowing through the passageway 602 may be determined based on signal propagation times associated with signal reflections from a first surface feature 604 proximate an outer surface 606 of the structure 600 and signal reflections from a second surface feature 608 distal from the outer surface 606. In this manner, the propagation times associated with the proximate surface feature 604 and the distal surface feature 608 can be used to determine the propagation times of acoustic signals through the cooling fluid in the passageway 602 to determine local temperatures and/or heat fluxes in the cooling fluid. In addition, the methods and apparatus described herein can be used to determine local temperatures and/or heat fluxes of more than one portion in a measured structure by selecting multiple echo pairs associated with different features in the structure. For example, referring to FIG. 7, the example methods and apparatus may be used to measure local temperatures and heat fluxes of cooling fluids in the passageways 702 and the material layer 706 sealingly engaging the passageways 702.

While some example implementations described herein use thermal models and inverse methods in connection with signal propagation times measured over time to determine local temperatures of inaccessible surfaces and heat fluxes based on those local temperatures, other example implementations can be used to determine heat fluxes without using thermal models and inverse methods and without determining local temperatures of inaccessible surfaces (e.g., the local surface temperatures of the inaccessible recess surface 812 or the inner surface 814 of FIG. 8). In such example implementations, the relatively high temporal resolutions for collecting repetitive propagation time measurements are also used to determine heat fluxes of portions within structural walls (e.g., the chamber wall 102).

The example temperature monitoring system 200 of FIG. 2 can be configured to use the thermal model approach to determine local temperatures and heat fluxes. Additionally or alternatively, the temperature monitoring system 200 can be configured to use the non-thermal model approach. In the thermal model approach, the thermal model is used with inverse methods to determine a local surface temperature of an inaccessible surface and a temperature profile along the depth of a structure being measured at various instances in time. A graphical representation of an evolving temperature profile is shown in FIG. 9.

Figure 9:
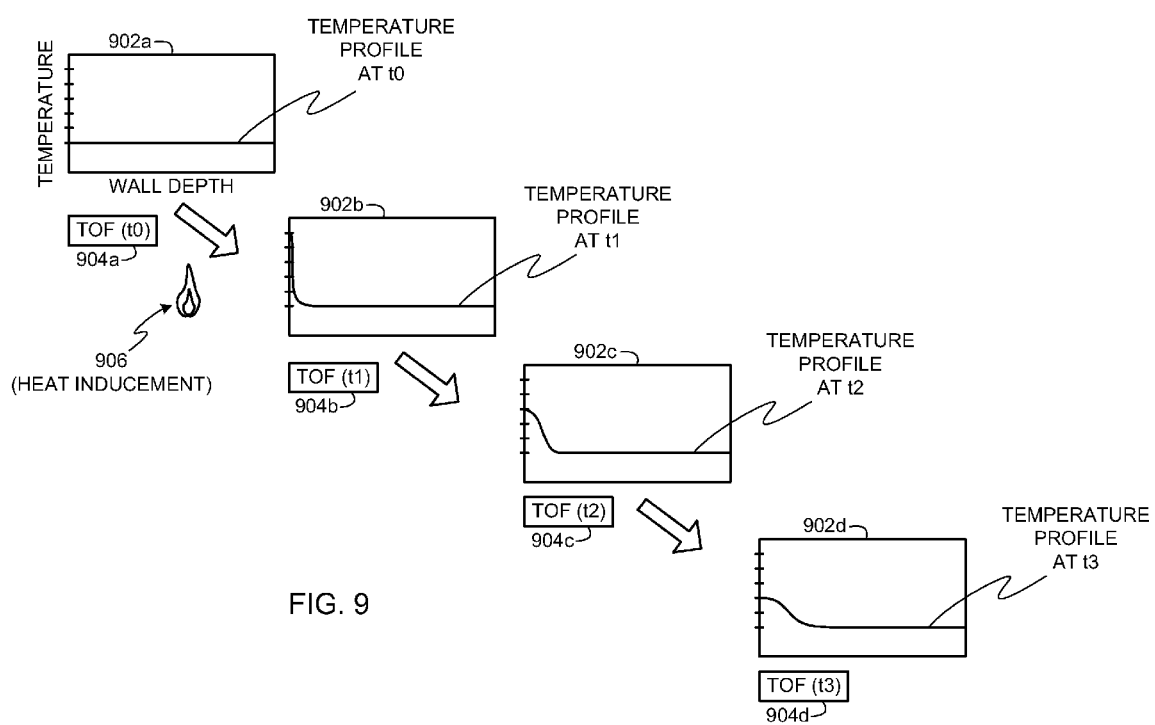
FIG. 9 is an example time sequence of temperature profiles of a chamber wall calculated over a duration during which the rocket fuel chamber of FIGS. 1 and 3 underwent temperature changes.

FIG. 9 illustrates an example time sequence of a plurality of temperature profiles 902a-d of the chamber wall 102 (FIGS. 1, 3, and 4) calculated over a duration during which the rocket fuel chamber 100 underwent changes in temperature. Each of the temperature profiles 902a-d was based on a respective one of a plurality of acoustic signal propagation measurements (TOF) 904a-d collected at different instances in time (t0-t3) while the rocket fuel chamber 100 underwent the temperature changes. Each of the temperature profiles 902a-d represents a different instantaneous spatial temperature distribution along the depth $d_w$ (FIG. 4) of the chamber wall 102. As described in greater detail below, a thermal model and inverse methods can be used to determine local temperatures (or boundary conditions) of the inner surface 104 (FIGS. 1, 3, and 4) based on the signal propagation times 904a-d measured at the different instances of time (t0-t3). In addition, the thermal model can be used to calculate the temperature profiles 902a-d and heat fluxes based on the local temperatures. Although only four time instances (t0-t3) are shown, more measurements may be collected during additional time instances.

Turning to FIG. 9 in greater detail, before the application of a heating event 906 having an unknown temperature, the signal propagation time 904a is measured at time t0 and the temperature profile 902a is calculated. The temperature profile 902a can be measured using the temperature sensor 110 (FIGS. 1 and 3) located anywhere on an isothermal portion of the rocket fuel chamber 100 (FIGS. 1 and 3). The temperature profile 902a shows a straight, flat line indicating that the temperature is the same along the wall depth $d_w$ (FIG. 4) of the chamber wall 102 which is due to the isothermal condition of the rocket fuel chamber 100 before the heating event 906 is applied. That is, during an isothermal condition the temperature at the outer surface 106 will be the same as the temperature through the wall depth $d_w$ and at the inner surface 104 of the chamber wall 102.

As the heating event 906 occurs on the inner surface 104 (FIGS. 1, 3, and 4), the measured signal propagation times 904b-d change in response to this event as the temperature profiles 902b-d evolve. At these subsequent measurement times, the chamber wall 102 is no longer in an isothermal condition. Instead, while the inner surface 104 is directly exposed to the heat source, its temperature and the temperature of its neighboring regions in the chamber wall 102 increase relatively faster than the temperatures in portions closer to the outer surface 106 and its neighboring regions. In a typical liquid rocket motor, an outer surface could reach a maximum temperature of less than 400 degrees Centigrade, while the surface temperature of an interior surface could reach 1600 degrees Centigrade.

In the illustrated example, the example temperature monitoring system 200 (FIG. 2) continues to monitor the changes in the signal propagation times 904b-d at times t1, t2, t3, etc. Using the relatively high temporal resolution of the signal propagation times 904a-d, initial local temperature boundary conditions, a thermal model, and inverse analysis methods the example temperature monitoring system 200 can substantially simultaneously (or during post processing) be used to estimate or determine the evolving temperature profiles 902b-d and the heat flux along the wall depth $d_w$ of the chamber wall 102. The precision of each temperature profile and heat flux value is governed by the thermal model, precision of the signal propagation times 904a-d, and the material properties of the chamber wall 102 including, for example, specific heat, thermal conductivity, thermal expansion, and velocity temperature coefficient. The temporal resolution associated with measuring the signal propagation times 904a-d is limited only by the ultrasonic pulse width and time-step between acquisitions which can be in the microsecond range.

When an acoustic signal propagates through a material, its propagation speed is a function of the local temperature in that material. Thus, the propagation time or time-of-flight (TOF) for an ultrasonic pulse is a function of the temperature distribution along the propagation path of the acoustic signal. Using a thermal model approach, the methods and apparatus described herein enable determining non-uniform temperature distributions using a path integral over the unknown temperature. Non-uniform temperature distributions are shown in the temperature profiles 902a-d of FIG. 9 and typically result from a heat source (e.g., the heating event 906 of FIG. 9) being applied to less than all the surfaces or structural features of a structure (e.g., to the inner surface 104 of FIG. 1 but not the outer surface 106). Performing local temperature calculations over time based on such information as shown in FIG. 9 enables determining transient thermal conditions, which can, in turn, be used to determine heat fluxes in materials. In particular, to characterize heat fluxes through a material, the example methods and apparatus described herein may be configured to determine thermal histories based on propagation times as shown in FIG. 9.

A thermal model approach can be implemented using standard inverse techniques. Solutions of the inverse heat conduction problem are predicated on the fact that a discrete number of interior temperatures are known and an unknown boundary condition (e.g., a local temperature of the inner (inaccessible) surface 104 of FIG. 1) is wanted. However, unlike the traditional inverse heat conduction problem (IHCP), signal propagation time (TOF) data does not provide local temperatures. Instead, the signal propagation time (TOF) data represents an integral over the temperature distribution along the propagation path of the acoustic signal. The thermal model approach described below is implemented using calculations based on that integral. Using the thermal model approach, an unknown heat flux and local temperature boundary condition (e.g., the local temperature of the inner surface 104 of FIG. 1) are approximated, and inverse techniques can be used by performing a forward conduction solution to convert the approximated heat flux and local temperature boundary condition to a temperature distribution in a measured material (e.g., the chamber wall 102 of FIG. 1). Then the temperature distribution is used to predict the propagation time required for an ultrasonic pulse to traverse the material. The difference between the calculated propagation time and the measured propagation time is minimized by adjusting the approximated heat flux and local temperature boundary condition. When the calculated propagation time and the measured propagation time substantially match, the adjusted heat flux corresponding to the matching calculated propagation time is regarded as the sought heat flux at or proximate the structural feature of interest in the measured medium.

Referring briefly to FIGS. 1, 3, and 4, the forward conduction solution can be described by way of example as being based on the occurrence of a heating event (e.g., the heating event 906 of FIG. 9) applied to the inner surface 104 causing a heat transfer from the inner surface 104 along the depth $d_w$ of the chamber wall 102 toward the outer surface 106. Constant properties such as the thermal load or temperature of the heating event are governed by equation 2 below.

$$\frac{\partial^2 \theta}{\partial x^2} = \frac{1}{\alpha}\frac{\partial \theta}{\partial t}, 0 \leq x \leq L, t > 0 \qquad \text{Equation 2}$$

In equation 2 above, x is the position in the chamber wall 102, θ is the temperature rise of the heating event above ambient conditions, and L is equal to the depth $d_w$ of the chamber wall 102 (FIGS. 1, 3, and 4).

The internal local temperature boundary condition (θ) (e.g., the local temperature of the inner surface 104) is a time-dependent function for the heat flux q(t) as described by equation 3 below.

$$-k\frac{\partial \theta}{\partial x} = q(t), x = 0, t > 0 \qquad \text{Equation 3}$$

In the illustrated example of FIGS. 1, 3, and 4, the known local temperature (θ) of the outer surface 106 is zero such that the parameters associated with the outer surface 106 are θ=0, x=L, and t>0. In addition, the initial condition of the chamber wall 102 is homogenous prior to the application of a heating event such that the parameters for the initial condition of the chamber wall 102 are θ=0, t=0, and 0≧x≧L.

For a constant heat flux at the inner surface 104 boundary (independent of time), the local temperature solution for constant properties is represented by equation 4 below.

$$\theta(x, t) = \frac{2q}{kL}\sum_{m=1}^{\infty} \frac{\cos(\beta_m x)}{\beta_m^2}\exp(-\alpha\beta_m^2 t) \qquad \text{Equation 4}$$

In equation 4 above, k is the thermal conductivity of the chamber wall 102, L is the thickness or depth $d_w$ of the chamber wall 102, and α is the thermal diffusivity of the chamber wall 102. In equation 4, the heat flux (q) is constant. In addition, $\beta_m$ is an Eigen-value of the kernel function cos ($\beta_m x$) and is described by equation 5 below.

$$\beta_m = \frac{(2m-1)\pi}{2L} \qquad \text{Equation 5}$$

In the illustrated example, the Eigen-value ($\beta_m$) is assumed to be a constant property. Because the local interior temperatures in the chamber wall 102 will span a wide range of values, the constant property assumption for the Eigen-value ($\beta_m$) may introduce some error. However, this approximation is tolerable because 1) the properties don't change dramatically over the temperature range (approximately 10%), 2) extreme temperatures are only seen in a very small location and for short times, so the impact is reduced, and 3) other approximations in comparison to real data limit the accuracy anyway.

In the illustrated examples described herein, Duhamel's theorem can be used with a piecewise constant approximation to the heat flux to generate a general solution for the boundary function associated with the local temperature of the inner surface 104. The temperature ($\theta_i(x)$) can be represented as a superposition of solutions for heat flux (q) at each of a plurality of time steps ($\Delta t$) as shown in equation 6 below.

$$\theta_i(x) = \sum_{m=1}^{\infty} \frac{2}{kL}(q_j - q_{j-i}) \sum_{m=1}^{\infty} \frac{\cos(\beta_m x)}{\beta_m^2} \exp(-\alpha \beta_m^2 (i-j)\Delta t) \qquad \text{Equation 6}$$

In equation 6 above, the heat flux (q) is zero at time t≧0, and the change in time is the time step ($\Delta t$)) between propagation time measurement samples. Thus, the time when the temperature ($\theta_i(x)$) is calculated corresponds to the time when the propagation time measurements are performed. In general, the duration of the time step ($\Delta t$) does not have to be constant, but the foregoing analysis does not require this added complexity. Instead, the time step ($\Delta t$) duration can vary because to obtain a single measurement requires an acoustic pulse to be emitted, traverse the chamber wall 102, and be detected by the acoustic transducer 108. However, during the traversal, the thermal transients are assumed to be negligible. As such, the thermal transients must be smaller than the propagation time (TOF) for the acoustic pulse. Based on an acoustic velocity of 5096 meters per second and a wall thickness of 0.064 meters, the signal transit time is of the order of 30 microseconds. The measured temperature rise occurs over 3 milliseconds, which is two orders of magnitude greater, so the assumption of negligible thermal transients is justified.

The methods and apparatus described herein to determine local temperatures and heat fluxes are based on the relationship between the propagation of acoustic energy through mediums and the temperatures of those mediums. Equations 7-10 below describe this acoustical relationship. The round-trip time for an acoustic pulse to traverse the chamber wall 102 is represented by equation 7 below.

$$G_i = \frac{2}{V_0} \int_0^L \frac{dx}{1 - P\theta_i(x)} \qquad \text{Equation 7}$$

Equation 7 is an expression of the travel time of the acoustic pulse based on a sound speed in the material of the chamber wall 102. In the illustrated example, the relationship in equation 7 is evaluated numerically. In equation 7 above, $G_i$ is a function of when an acoustic pulse is triggered, i represents various locations along the depth $d_w$ of the chamber wall 102, $V_0$ is the base acoustic velocity of the material being monitored at some reference temperature $T_0$ (e.g., a temperature of the measured material in an isothermal condition before a heating event), P is the acoustic velocity-expansion factor, and $\theta_i(x)$ is the temperature in the chamber wall 102. The change in temperature ($\theta_i(x)$) is relative to the reference temperature $T_0$ (i.e., $\theta_i(x) = T(x) - T_0$).

If the sound speed (V) is constant (as would be the case if the wall is in an isothermal condition), then the propagation time (G) of the acoustic signal is represented by equation 8 below.

$$G = \frac{2L}{V_0} \qquad \text{Equation 8}$$

In equation 8 above, L is the travel length (e.g., the depth d of the chamber wall 102), and the factor of two arises because the wave travels through the length L and then returns before it is detected as described above in connection with FIGS. 3 and 8.

If the sound speed is a function of temperature, then the integral over the length L is used to determine the propagation time (G) as shown in equation 9 below.

$$G = 2\int_0^L \frac{dx}{V(\theta(x))} \qquad \text{Equation 9}$$

The velocity function V(θ(x)) of equation 9 above is approximated as a linear function of temperature using a calibration curve represented by equation 10 below.

$$V(\theta(x)) = V_0(1 - P\theta(x)) \qquad \text{Equation 10}$$

The acoustic velocity-expansion factor (P) can be determined by measuring the propagation time (G) of an acoustic signal through a known length (L) of the material used to form the chamber wall 102 while the material is in an isothermal condition. A calibration curve can then be generated by measuring propagation times (G) at various steady, isothermal temperatures. The acoustic velocity-expansion factor (P) is then set equal to the slope of the calibration curve. In general, the acoustic velocity-expansion factor (P) does not have to be linear in temperature. However, in the illustrated examples describe herein, the calibration curve is linear over a wide range of temperatures, and therefore the acoustic velocity-expansion factor (P) is treated as a constant velocity-temperature factor in which $$P = \left(\frac{1}{V}\right)\left(\frac{\partial V}{\partial T}\right).$$

An inverse technique used to determine a thermal model to determine local temperatures and heat fluxes is described below in connection with equations 11-16. An estimate of an unknown boundary condition (e.g., the local temperature of the inner surface 104 of FIGS. 1, 3, and 4) can be determined by comparing the measured propagation time (G) to a calculated propagation time ($\hat{G}$) and minimizing the difference (S) therebetween as represented by equation 11 below.

$$S = (G - \hat{G})^T (G - \hat{G})$$ Equation 11

The difference (S) is minimized by inferring or guessing a value for the heat flux (q) at a time step, using that inferred heat flux value to calculate the propagation time ($\hat{G}$), and evaluating equation 11 above. To maintain stability and speed up convergence, a heat flux previously estimated for a previous time step can be used as an initial inference or guess for the current time step.

The iterated solution for minimizing the difference (S) of equation 11 above can be linearized with the sensitivity as shown in equation 12 below.

$$\frac{dG}{dq} = \frac{G(\hat{q} + \delta q) - G}{\delta q}$$ Equation 12

The expression for sensitivity shown in equation 12 above can be normalized as shown in equation 13 below.

$$X^* = \left(\frac{dG}{dq}\right)^* = \left(\frac{dG}{dq}\right)\left(\frac{q_{max}}{G_{base}}\right)$$ Equation 13

In equation 13 above, $q_{max}$ is the maximum estimated heat flux value, and $G_{base}$ is the propagation time for an acoustical pulse when the measured medium is at a constant, isothermal ambient temperature. To reduce the amplification of measurement noise, a function specification approach can be used. Such an approach relaxes the exact matching of the data and fits a presumed functional form of the unknown heat flux to the measured data. In this manner, a bias based on future behavior is introduced, and the stability of the solution is improved. While excessive bias can degrade the estimate, the effects of the number of future times can be monitored and analyzed to substantially reduce such degradation.

FIGS. 10-15 represent verification data generated using three assumed heat flux profiles of a naval ship gun barrel during a firing regimen. The verification data was used to verify the above-described techniques to determine local temperatures and heat fluxes. The heat flux input functions associated with the three heat flux profiles all contained the same amount of energy ($3.75 \times 10^6$ J/m$^2$) and persisted over the same time interval. These assumed heat fluxes mimicked experimental conditions discussed below. The forward solution was used to generate corresponding temperature response in the wall of the gun barrel. The data was integrated to obtain a propagation time for an ultrasonic pulse, and the propagation times were then used as calibration data for evaluating the proposed solution approach described above. FIG. 10 illustrates a table showing the material properties of the naval ship gun barrel used to predict heat flux measurements based on ultrasonic measurements.

Figure 11:
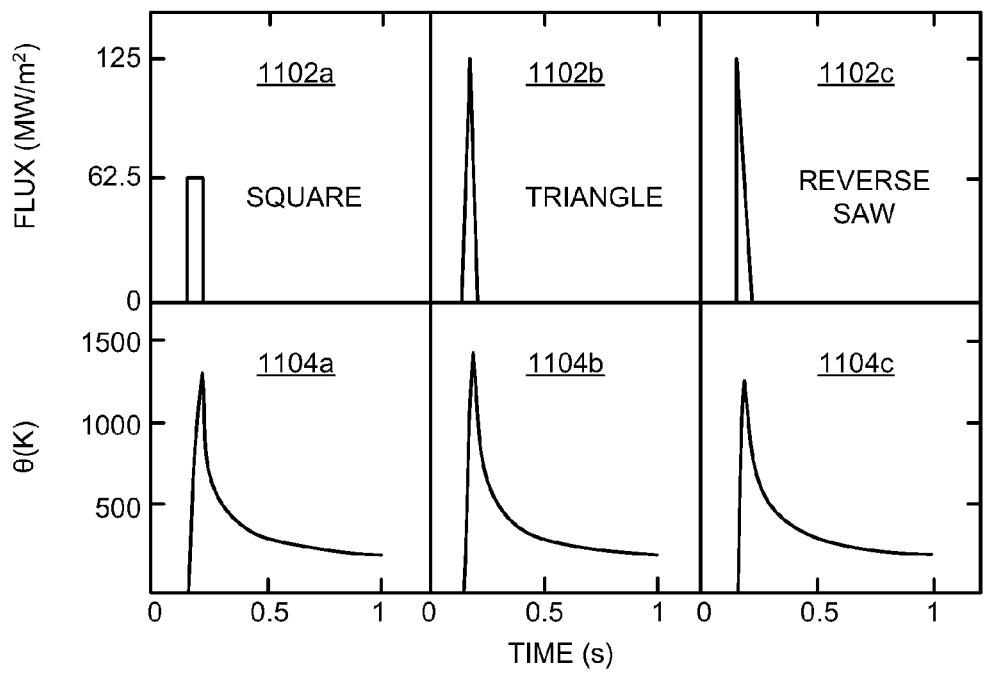
FIG. 11 shows the idealized cases of heat flux used to evaluate a solution method based on a thermal model and inverse techniques.

FIG. 11 shows the idealized cases of heat flux used to evaluate the solution method based on a thermal model and inverse techniques. Flux data 1102a is based on a square wave signal having a period of 0.06 seconds and an amplitude of $6.25 \times 10^7$ W/m$^2$. Flux data 1102b is based on a triangular wave signal having a period of 0.06 seconds and a maximum amplitude of $1.25 \times 10^8$ W/m$^2$. Flux data 1102c is based on a reverse saw-tooth wave having a period of 0.06 seconds and a maximum amplitude of $1.25 \times 10^8$ W/m$^2$. The resulting temperatures ($\theta(K)$) at the interior surface (e.g., an inner inaccessible surface of a gun barrel bore) associated with each of the flux data 1102a-c are shown in temperature data curves 1104a-c along with the propagation time data for each case.

Figure 12:
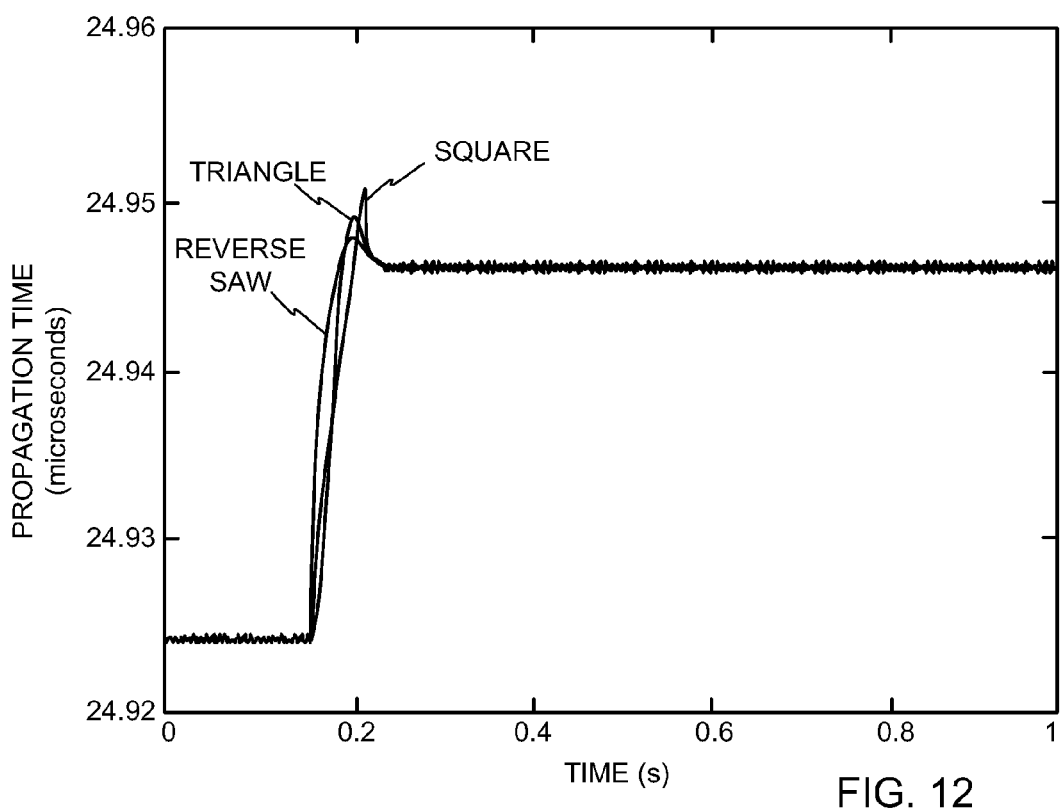
FIG. 12 shows plots of simulated data representing propagation times of acoustic signals through a measured medium and noise associated therewith.

In the testing represented by the data of FIGS. 11-15, Gaussian, zero-mean noise was added to the calibration data to simulate the actual noise level in the ultrasonic measurement data discussed below in connection with FIGS. 16-18. The noise level extracted from actual measurements during steady state was approximately 0.5%. This value is relatively small because of the maturity of acoustic measurement capabilities. This low noise level can be advantageously used to relatively accurately characterize the heating using ultrasonic pulses. The simulated data including noise is shown in FIG. 12. The illustrated data show how the propagation time is a function of the total amount of energy in the medium being monitored and not necessarily of the temperature distribution of the medium. After a heating event (e.g., the heating event 906 of FIG. 9) is applied, the propagation time remains relatively constant, even though a steep gradient exists in the monitored gun barrel wall. This effect is not unexpected as equation 7 discussed above shows how the propagation time is an integral over the entire temperature distribution.

Figure 13:
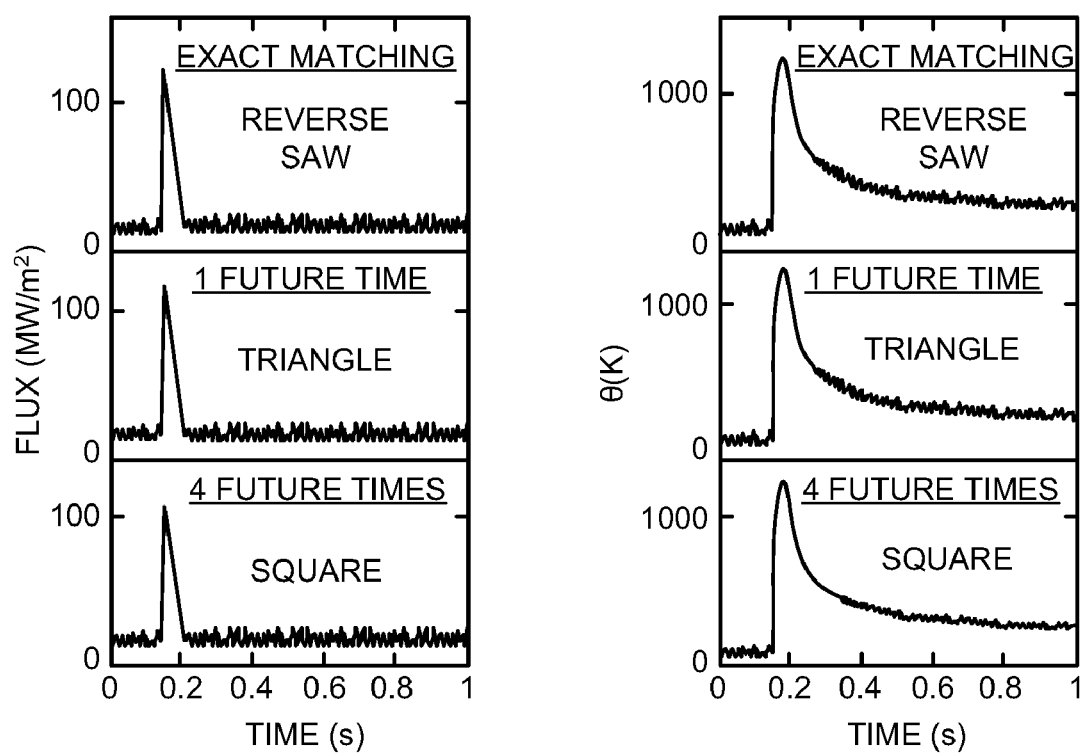
FIG. 13 shows plots of heat flux estimates determined using a thermal model and inverse techniques in connection with the noisy propagation time data for a reverse saw-tooth signal shown in FIG. 12.

Heat flux estimates were obtained using exact matching and a function specification method assuming a piecewise constant heat flux using 1-6 future propagation time steps ($\Delta t$)) to evaluate the appropriate amount of bias for this particular solution. The heat flux estimates shown in FIG. 13 are the result of applying the solution method to the noisy propagation time data for the reverse saw-tooth signal using exact matching along with future propagation time steps ($\Delta t$) 1 and 4. FIG. 13 also shows the reconstructed temperature of the internal inaccessible surface of the measured medium.

Figure 14:
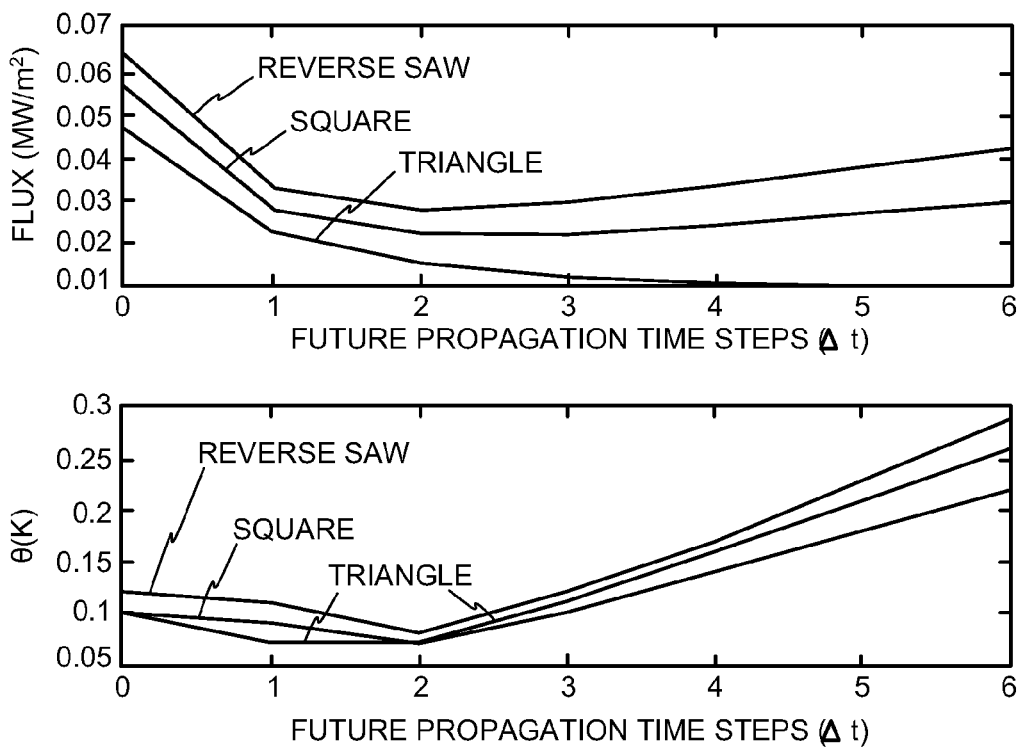
FIG. 14 shows data plots of temperatures and heat flux corresponding to signal propagation times measured at different instances in time.
Figure 15:
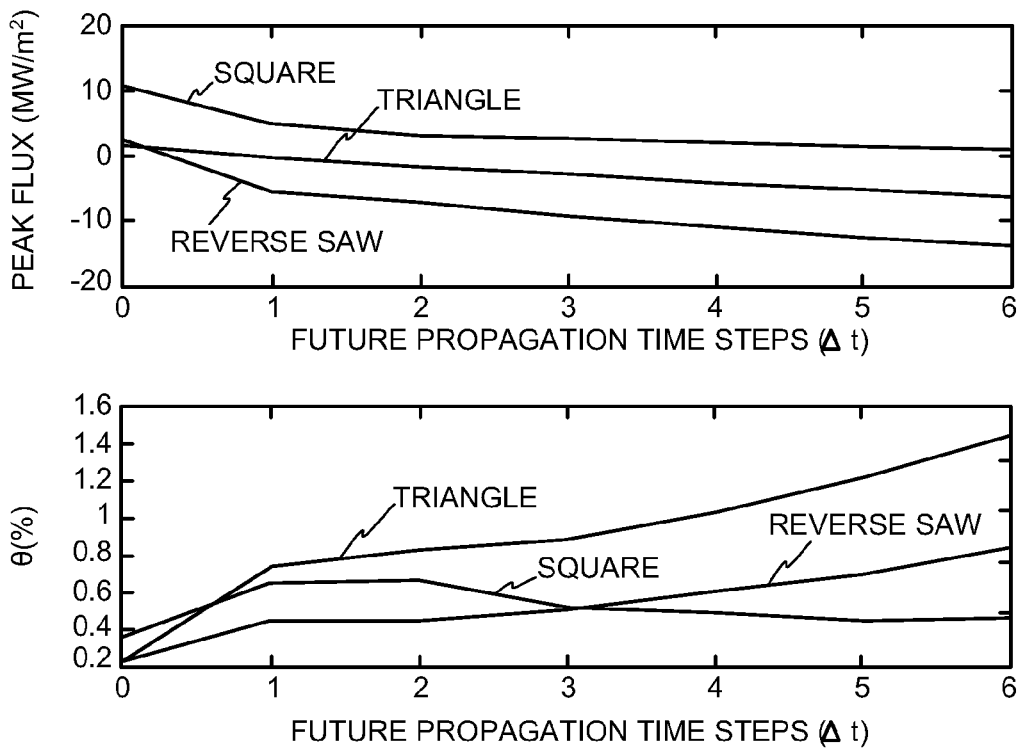
FIG. 15 shows data plots of temperature error and peak heat flux corresponding to signal propagation measurements collected at different instances in time.

Instabilities in inverse solutions typically appear where gradients (e.g., thermal gradients) are large. In the measurements associated with the reverse saw-tooth signal, the heat flux rises instantaneously, which normally results in overestimation of the boundary flux and represents the worst-case scenario for an estimation procedure to handle. The future propagation time steps ($\Delta t$)) introduce bias and have limited the ability to capture the precise peak. FIGS. 14 and 15 show the errors in the estimates of the peak values of both the heat flux and the maximum temperature ($\theta(K)$) of the internal surface of the measured medium for each type of signal (i.e., the square wave, the triangle wave, and the reverse saw-tooth) using the solution method described above. In the illustrated example, the errors associated with estimated heat flux are larger than the ones associated with the estimation of peak temperature, because the solution for temperature from a boundary heat flux can generally be expressed as a Volterra equation of the second kind. Thus, errors of the solution are unbounded, resulting in amplification of the measurement noise. The values shown in FIGS. 14 and 15 reflect the observation that little bias is required to obtain an acceptable solution due to the extremely low noise level in the measured quantity of the ultrasonic pulses as evidenced in the propagation time data of FIG. 13 for the reverse saw-tooth signal.

The RMS errors shown in FIG. 14 were calculated using equation 14 below.

$$\varepsilon_{RMS} = \frac{\sqrt{\sum_{p=1}^{N} (\psi_{actual} - \psi_{est})^2}}{N}$$ Equation 14

In equation 14 above, N is the number of data points, and ψ is the quantity of interest (either heat flux or temperature). The peak errors of FIG. 14 were calculated using equation 15 below.

$$\frac{\psi_{est} - \psi_{actual}}{\psi_{actual}} \times 100\% \qquad \text{Equation 15}$$

Based on equation 15 above, a positive error in FIG. 15 indicates an overestimation of a quantity and a negative error indicates an underestimation.

The sensitivity of the measured quantity to changes in estimated heat flux was calculated to determine confidence intervals for the estimates. This sensitivity was used to quantify the change in flux by performing a test heat flux case using a single time step (Δt) of non-zero heat flux to observe the resultant change in pulse transit time indicative of the change in flux. The measured quantity in involved an integration over the temperature distribution and, thus, the quantified sensitivity was substantially different than sensitivities of other inverse heat conduction problems (IHCP's). In particular, the propagation time quantity (G) is related relatively more to the amount of energy in the measured medium and not the magnitude of the temperature. Where a single pulse of energy is used, the amount of energy in the measured medium is constant until the energy has diffused across the domain, which is much longer than the experimental time considered in the verification test example described above in connection with FIGS. 10-15. Because the amount of energy in the measured medium is relatively constant in time, the propagation time (G) did not change in time either. As a result, the sensitivity is constant in time after the pulse. For this analysis the change in the propagation time (G) after the pulse (2.312×109 seconds) was used in equation 12 above, along with the heat flux required to manifest the change (1×108 W/m2). This ratio was normalized as indicated in equation 13 above. The resulting normalized sensitivity was 9.227×10-5. This normalized sensitivity is much smaller than is typically considered useable for most inverse heat conduction problems. However, because the measurement noise is so small, the above-described techniques can be used to apply relatively accurate solutions such that the 95% confidence interval on the estimates can be approximately ±5% of the actual value.

An example experiment described below in connection with FIGS. 16-18 was conducted to test the above-described techniques with real-world data collected under real, physical testing conditions of a naval ship gun barrel during a firing regimen. In particular, the above techniques were applied to data collected at the Naval Surface Warfare Center in Dhalgren Va. The data was gathered during the firing of a Mark 45 Naval Gun. The physical constants for the problem were based on the gun being constructed with AISI 4340 (UNS G43400) steel.

Figure 16:
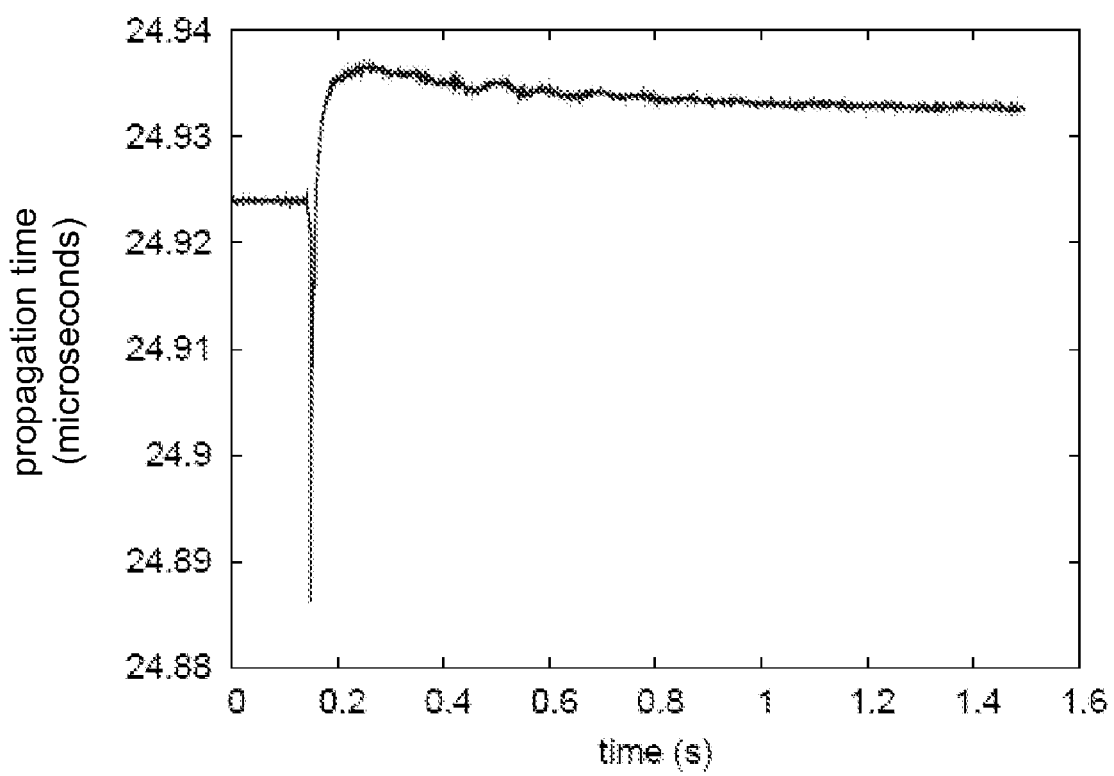
FIG. 16 shows the raw propagation time of a measured ultrasonic pulse emitted into the wall of the measured gun barrel of FIG. 5.

FIG. 16 shows the raw propagation time of a measured ultrasonic pulse emitted into the wall of the measured gun barrel. The abrupt drop in the measured propagation time recorded before the 0.2 second marker was attributed to a non-related physical phenomenon of the firing of the gun system and is not related to the thermal effects on acoustic velocity. The recorded abrupt drop produces non-real cooling and temperature decreases in the calculated data and is discarded for purposes of determining local temperatures and heat flux using the above-described techniques.

Figure 17:
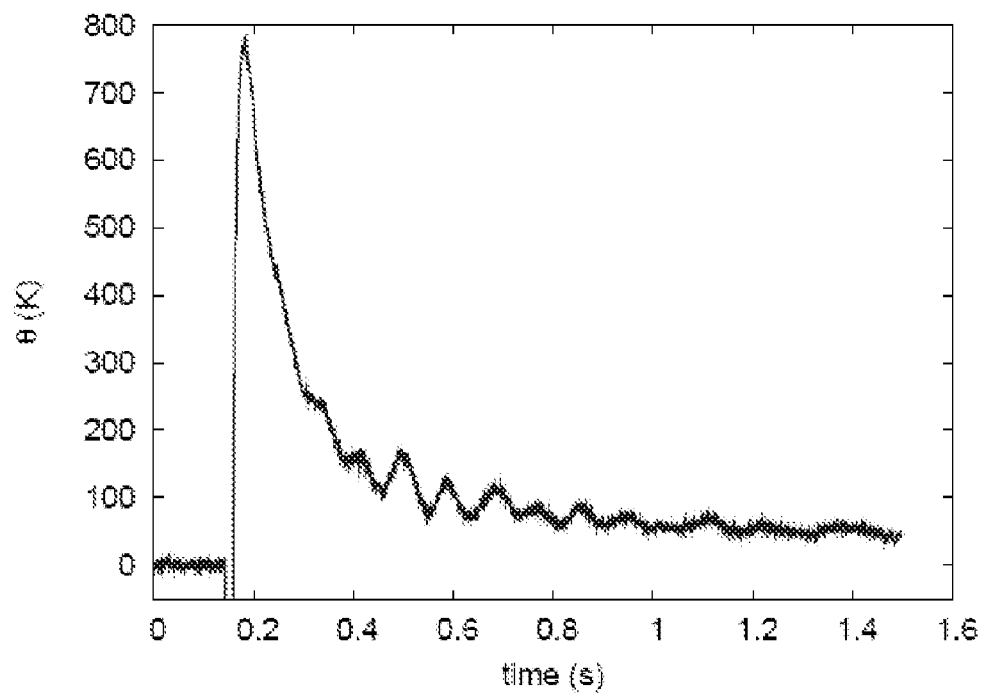
FIG. 17 shows the calculated temperature history of an inner inaccessible surface of the measured gun barrel of FIG. 5.

FIG. 17 shows the calculated temperature history of the inner inaccessible surface of the gun barrel. The data was calculated, along with the heat flux shown in FIG. 18 using two future time steps to reduce the noise in the result. Two future time steps (Δt)) were selected because for the experimental purposes there was more interest in the shape of the pulse than the magnitude at the peak because the experimental analysis was used to identify events within the barrel over time, not the maximum temperature reached. Therefore, by adding the bias of the two future time steps (Δt), a relatively more accurate overall representation for the heat flux as suggested by the analysis in FIG. 14 can be obtained. In addition, additional bias does not improve the estimates significantly. If there is a greater interest in the peak value, then the analysis represented by the data in FIG. 15 suggests that fewer (e.g., possibly 0) future time steps (Δt) are required. Furthermore, the ability to capture the peak temperature through adjusting the number of future time steps (Δt) is strongly dependent on the type of heating that occurs. Therefore, a sacrifice of the peak values in favor of low RMS errors can be made.

Based on the analysis of the calibration data, it is estimated that the maximum heat flux is underestimated by no more than 6%, which is the percentage of the reverse saw tooth for three future time steps (Δt), and that the actual peak temperature is 4° C. lower than shown based on a 0.5% temperature error from the saw tooth at two future time steps (Δt). Because the actual heat flux does not rise instantaneously, a better matching of the peak heat flux can be obtained.

Figure 18:
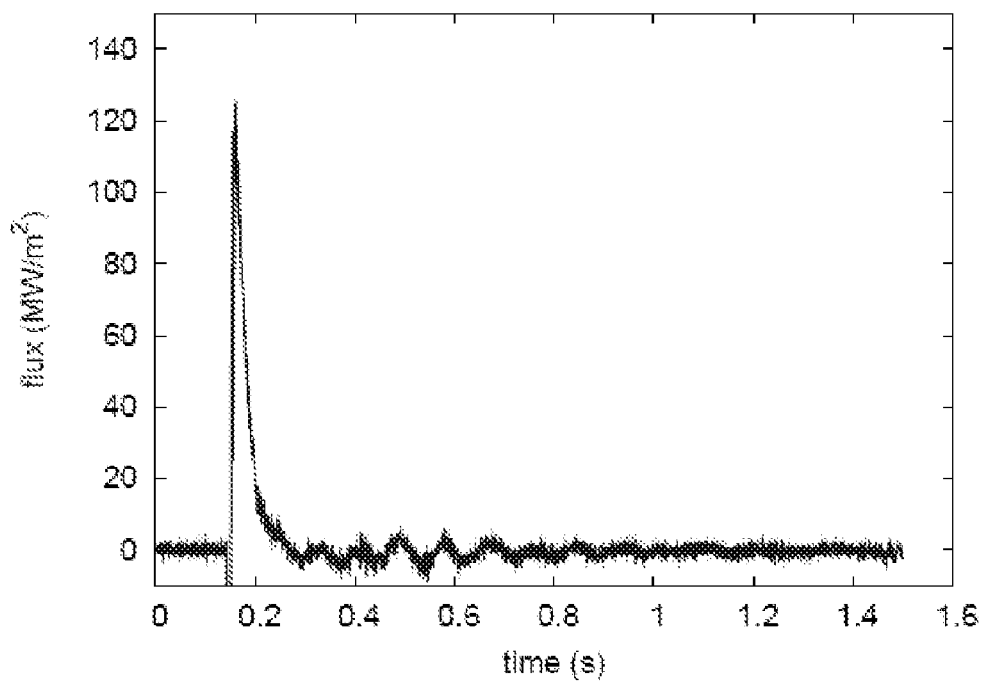
FIG. 18 shows the calculated heat flux history of the inner inaccessible surface of the measured gun barrel of FIG. 5.

The curve shown in FIG. 18 is indicative of a short duration, high temperature event inside the gun barrel. The oscillations in the temperature data starting at about 0.3 seconds is likely attributable to effects of flow of combustion products out of the gun barrel after firing and the associated equalization of pressure with the ambient level. These oscillations could also be due to changes in the barrel dimensions attributable to the vibration of the system as a result of the firing event. In any case this effect can also be seen in the propagation time data shown in FIG. 16. The maximum temperature indicated by the calculated data of 789.4° C. is in approximate agreement with the maximum estimated bore temperature of 944° C. This quantity can be estimated using equation 16 below.

$$T_{max} = \frac{T_f - 540}{1.8 + 7130 d^{2.22} m_c^{-0.86} v_m^{-0.86}} + 300 \qquad \text{Equation 16}$$

In equation 16 above, $T_f$ is the propellant flame temperature, d is the bore diameter, $m_c$ is the mass of the propellant charge, and $v_m$ is the projectile muzzle velocity. For the gun barrel used to generate the data illustrated in FIGS. 16-18, the propellant charge ($v_m$) was equal to 831 m/s, the bore diameter (d) was equal to 0.155 m, and the mass of the propellant charge ($m_c$) was equal to 8.3 kg.

The maximum heat flux of 120 MW/m² indicated by the peak data in FIG. 18 is reasonable based on predictions of the amount of total propellant charge energy lost as heat when firing a projectile. Knowing the mass of the projectile to be 31 kg, the kinetic energy of the projectile is calculated to be 10.7 MJ. A 7 kg charge contains about 33.1 MJ of energy. Therefore, the gun efficiency is approximately 33%, which is a typical efficiency. Heat loss to the barrel is estimated at 66.9% of the total energy of the propellant, or about 22.1 MJ. The integral represented by the data in FIG. 18 can be approximated as the area in a triangle (i.e., 0.5×120 MW/m²×0.1 s×=6 MJ/m²). If the area of the barrel is 3.83 m² then the energy is 22.98 MJ, which is less than 4% off from the estimates. Of course some of the enthalpy in the propellant is blown out of the gun barrel end, and the energy deposited is not done so uniformly. Nonetheless, the approximation agrees well with the estimates from the propagation time data discussed above in connection with FIGS. 10-15.

The techniques described above in connection with FIGS. 9-18 use a thermal model and inverse methods to estimate or determine a local temperature of an inaccessible heat flux boundary (e.g., the inner surface 814 of a gun barrel bore) and use the local temperature to determine a heat flux. In alternative example implementations, the example methods and apparatus described herein can be used to determine heat fluxes without requiring the estimation or determination of a local temperature of a heat flux boundary and without requiring use of a thermal model or inverse methods.

As discussed above in connection with FIG. 9, a measured medium (e.g., the chamber wall 102 of FIG. 1) can have different thermal gradients as heat is applied to a surface thereof. For example, in FIG. 9, a thermal gradient in the chamber wall 102 due to the heating event 906 is shown as the evolving temperature profiles 902a-d. The propagation time (G) of an acoustic signal transmitted through a measured medium can be obtained by integrating the temperature-dependent sound speed over the thickness (e.g., the wall depth $d_w$ of FIG. 4). Equation 17 below represents this integration, which is derived from equations 7 and 8 above.

$$G = 2\int_0^L \frac{dx}{V_0[1 - P\theta_i(x)]} \quad \text{Equation 17}$$

This expression for propagation time shown in equation 17 above describes the variation in travel time for an ultrasonic pulse resulting from temperature fluctuations. However, the path length traveled (L) and the acoustic velocity (V) both change with temperature. In particular, the length (L) changes because of the coefficient of thermal expansion (BE) and the acoustic velocity (V) changes because of the stiffness of the material varies with temperature (the binding forces vary with temperature). However, the two parameters are relatively highly correlated, which means the effects need not be distinguished. In the definition of propagation time (G) shown in equation 17 above, the effects of thermal expansion and acoustic velocity (V) are combined into and represented by the acoustic velocity-expansion factor (P).

To determine heat flux without requiring the estimation or determination of a local temperature of a heat flux boundary, an ultrasonic coefficient ($\xi$) can be used to represent how the propagation time changes based on temperature, which is indicative of the combined thermal expansion and velocity effects. Using the ultrasonic coefficient ($\xi$), equation 17 can be expressed as shown below in equation 18.

$$G = \frac{2}{V_0}\int_0^L [1 + \xi\theta(x)]dx \quad \text{Equation 18}$$

In equation 18 above, the value of two accounts for the round-trip travel time of the acoustic signal as it is transmitted and echoed. In addition, $\theta(x)=T(x)-T_0$ is the temperature change relative to the temperature reference $T_0$.

The ultrasonic coefficient ($\xi$) of equation 18 above is defined as shown in equation 19 below.

$$\xi = \frac{1}{G}\frac{dG}{dT} = \frac{1}{L}\frac{dL}{dT} - \frac{1}{V}\frac{dV}{dT} \quad \text{Equation 19}$$

The first term on the right hand side $$\left(\text{i.e., } \frac{1}{L}\frac{dL}{dT}\right)$$

is the linear coefficient of thermal expansion for isotropic materials (EB). The temperature dependence of the velocity (V) can be approximated by writing the sound speed in a solid in terms of the Young's modulus and density $$\left(V \equiv \sqrt{\frac{E}{\rho}}\right),$$

such that equation 19 can be expressed as shown in equation 20 below.

$$\frac{1}{V}\frac{dV}{dT} = \frac{1}{2}\left[\frac{1}{E}\frac{dE}{dT} - \frac{1}{\rho}\frac{d\rho}{dT}\right] \quad \text{Equation 20}$$

The second term $$\left(\frac{1}{\rho}\frac{d\rho}{dT}\right)$$

is the volumetric coefficient of thermal expansion given as $-3\times$(EB). The temperature dependence on the Young's modulus is considered a constant, referred to herein as the temperature coefficient of velocity change ($\gamma$).

Thus, the ultrasonic coefficient ($\xi$) can be expressed as shown in equation 21 below.

$$\xi = -\frac{1}{2}(EB + \gamma) \quad \text{Equation 21}$$

The ultrasonic coefficient ($\xi$) is constant (i.e., it is not a function of temperature) for a relatively large number of materials over large temperature ranges.

Using the above-described equations, propagation time (G) can be expressed as shown in equation 22 below.

$$G = \frac{2L}{V_0} + \frac{2\xi}{V_0}\int_0^L \theta(x)dx \quad \text{Equation 22}$$

The integral of equation 22 above represents the total energy added to the measured medium relative to the reference energy. For a one-dimensional control volume of a solid medium with some heat transfer on both boundaries (i.e., the inner surface 104 and the outer surface 106 of the chamber wall 102 of FIGS. 1, 3, and 4), an energy balance in the measured medium indicates the existence of a heat flux (q") as shown in equation 23 below.

$$q''(x=0) = \rho V_p \int_0^L \frac{\partial \theta(x)}{\partial t} dx + q''(x=L) \qquad \text{Equation 23}$$

For short time periods, the time derivative can be approximated as a difference as shown in equation 24 below.

$$q'' = \frac{\rho V_p}{\Delta t} \int_0^L \theta(x) dx + q_L'' \qquad \text{Equation 24}$$

In equation 24 above, the subscripts 0 and L are used to identify the respective boundaries (e.g., L represents the outer surface 106 and 0 represents the inner surface 104 of FIGS. 1, 3, and 4). The integral of equation 24 above can also be expressed in terms of the change in propagation time ($\Delta G$) (which can be obtained using equation 22 above) as shown below in equation 25.

$$q_0'' = \frac{\rho V_p}{\Delta t} \frac{V_0 \Delta G}{2\xi} + q_L'' \qquad \text{Equation 25}$$

Equation 25 relates the unknown and inaccessible heat flux ($q_0''$) (e.g., a heat flux associated with the inner wall 104 of FIGS. 1, 3, and 4) directly to a measurable time difference quantity ($\Delta G$) assuming an accessible surface (e.g., the outer surface 106) can be measured (e.g., a surface at x=L). Unlike known traditional techniques for determining heat flux, the techniques described above in connection with equations 17-25 can be advantageously used over such known traditional techniques. In particular, unlike thermopiles and calorimeters, the transient response of an acoustic signal is limited only by the speed of sound and not the thermal mass of the sensor. In addition, measurements can be made remotely, which prevents the disturbance of the measured quantity and removes the sensor from the harsh thermal environment. Also, unlike techniques using inversion of temperature measurements, the heat flux can be computed from an algebraic equation so that measurement noise does not get amplified through the inversion process.

An example analysis to evaluate the efficacy of the technique described above in connection with equations 17-25 for measuring heat fluxes was performed. In that analysis, two types of heating were used in which the accessible boundary heat flux ($q_L''$) was known. The first type of heating involved constant heating and the second type of heating involved a periodic heating. In each case, an analytic conduction solution was obtained for a prescribed boundary heat flux ($q_p''$). From this temperature distribution a simulated propagation time (G) was obtained by integrating the distribution using equation 18 above. The thermal properties, dimensions, and ultrasonic coefficient ($\xi$) were assumed known. In the example analysis a heat flux ($q_0''$) was calculated based on the simulated propagation time (G). The calculated heat flux ($q_0''$) was then compared to an originally prescribed heat flux ($q_p''$) and errors therebetween were estimated. In operation while measuring a material such as the chamber wall 102 of FIGS. 1, 3, and 4, the heat flux ($q_0''$) is unknown, and the propagation time (G) for two acoustic pulses separated by a time $\Delta t$ would be used to obtain the calculated heat flux ($q_0''$) directly. The material properties of the material measured for the example analysis included a thermal conductivity (k) equal to 250 W/mK, a thermal diffusivity ($\kappa$) equal to $1.03 \times 10^{-6}$ m$^2$/s, and an acoustic speed (V) equal to 4877 m/s, and an ultrasonic coefficient ($\xi$) equal to $22.2 \times 10^{-6}$ m/mK. These properties are approximately those of aluminum.

In the constant heating type case, the measured material was a 1-centimeter thick slab (i.e., L=1 cm). After a heating event is applied to a surface boundary at x=0, a change in heat flux ($q_0''$=1 MW/m$^2$) is applied at x=0 and t$\geq$0. After a small amount of time (i.e., small Fo), the temperature response and the heat transfer at the boundary x=L is negligible because the injected energy has not had enough time to penetrate the measured slab. Therefore, the accessible heat flux is equal to zero ($q_L''$=0). The temperature solution can be expressed as shown in equation 26 below.

$$\frac{\theta(x,t)}{\theta_{SS}} = 1 - x^* - 2\sum_{n=0}^{\infty} \frac{(-1)^n}{\beta_n^2} \sin[\beta_n(1-x^*)]\exp(\beta_n^2 Fo) \qquad \text{Equation 26}$$

Figure 19:
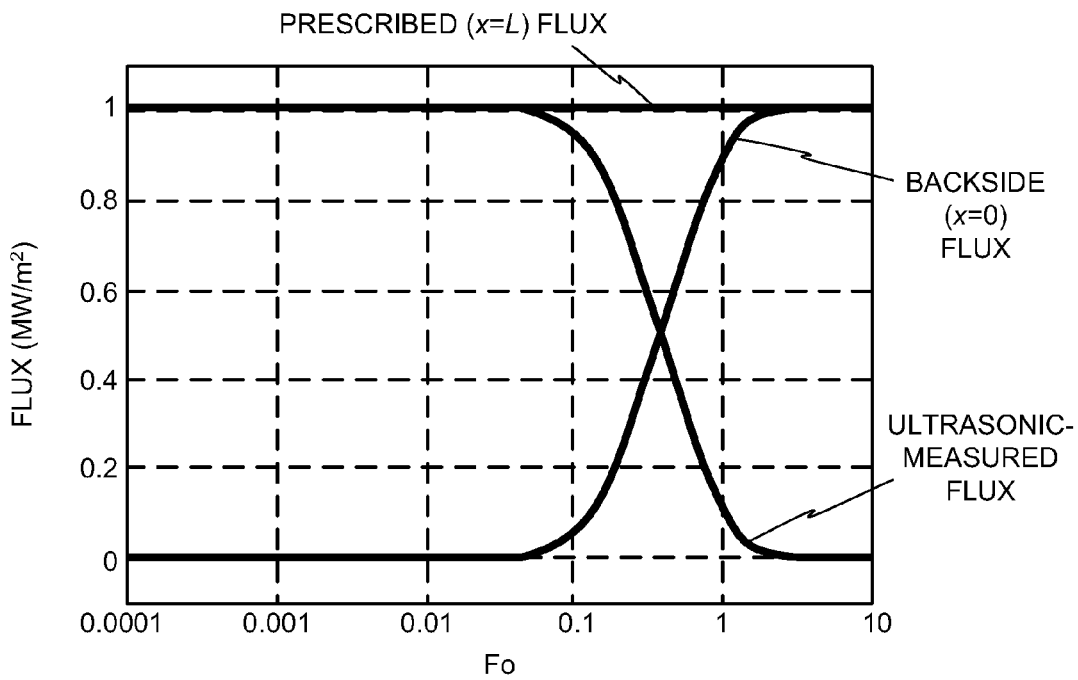
FIG. 19 shows an ultrasonic-based calculated heat flux as a function of small, incremental times for a prescribed heat flux of unity.

In equation 26 above, $\beta_n = (2n+1)\pi/2$, $x^* = x/L$, and $Fo = \kappa t/L^2$. The temperature normalized by the steady state temperature on the interior surface $\theta_{SS} = q''L/k$. FIG. 19 shows the ultrasonic-based calculated heat flux ($q_0''$) as a function of small, incremental times (Fo) for a prescribed heat flux ($q_p''$) of unity.

For times Fo<0.05, the slab behaves like a semi-infinite slab where the accessible, backside surface (e.g., the outer surface 106 of FIGS. 1, 3, and 4) boundary condition does not affect the temperature distribution. In this limit, the heat flux ($q_L''$) leaving the slab at x=L is negligible and the ultrasonic-measured heat flux ($q_0''$) is a good estimate of the interior (x=0) boundary heat flux (i.e., the heat flux at or near the inner surface 104 of FIGS. 1, 3, and 4).

In the periodic heating type case, the prescribed heat flux ($q_p''$) at an inner surface (x=0) is defined by equation 27 below.

$$\frac{q_0''(t)}{q_{max}''} = \sin(2\pi t^* + \pi/4) \qquad \text{Equation 27}$$

In equation 27 above, the time (t) is normalized by a period ($\tau$). The temperature distribution, which results from the applied flux and which is used to generate the propagation time, is expressed in equation 28 below.

$$\frac{\theta(x,t)}{\theta_{max}} = \exp(-x^*)\sin(2\pi t^* - x^*) \qquad \text{Equation 28}$$

In equation 28 above, $\theta(x,t) = T(x,t) - T_{mean}$, and $x^* = x/x_p$ is normalized by a penetration depth parameter $$\left(x_p = \sqrt{\frac{\kappa \tau}{\pi}}\right).$$

The maximum heat flux ($q_{max}''$) and maximum temperature ($\theta_{max}$) are related by the period of the oscillations through $x_p$ as shown in equation 29 below.

$$\frac{q_{max}''}{\theta_{max}} = \frac{\sqrt{2}\,k}{x_p} \qquad \text{Equation 29}$$

Figure 20:
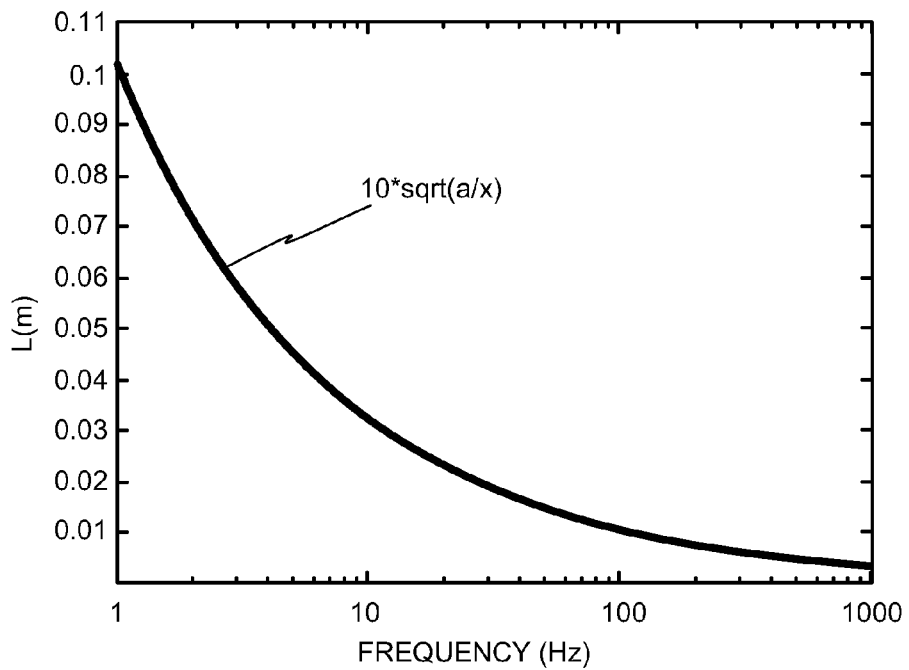
FIG. 20 shows heat flux data corresponding to a measured medium thickness that gives an error less than 0.05% for an assumption that an accessible heat flux is equal to zero.

The integration of the temperature distribution and subsequent determination of the propagation time follows as in the constant heating case. For the periodic heating test case analysis, the depth of the slab, which is also the distance that the ultrasonic pulse travels, was selected so that the thermal oscillations did not extend to the exterior boundary (e.g., the outer surface 106 of the chamber wall 102 of FIGS. 1, 3, and 4). In this manner, the semi-infinite solution (equation 28) can be used for the temperature distribution. For $L = 9x_p$, the effect of the boundary (error <0.05%) is reduced to the point that other numerical artifacts, such as the numerical integration, are more significant than the error in the estimate. FIG. 20 shows the slab thickness that gives an error less than 0.05% for the assumption that $q_L'' = 0$. Everything above the plotted curve gives smaller errors. Note that the ultrasonic measurement approach described above in connection with equations 17-25 can also be used effectively for thinner slabs (below the plotted curve of FIG. 20). For thinner slabs, however, the heat out of the exterior surface (e.g., the outer surface 106 of FIGS. 1, 3, and 4) should be characterized to satisfy the energy balance described above in connection with equation 18.

For the constant prescribed heat flux ($q_p''$), the size of the pulse-separation $\Delta t$ parameter (indicative of the time separating two acoustic pulses) does not affect the solution because the piecewise constant assumption matches the actual heat flux. However, if the prescribed heat flux ($q_p''$) varies, as in the case of periodic heating, the piecewise constant assumption could break down for large pulse-separation values $\Delta t$.

Figure 21:
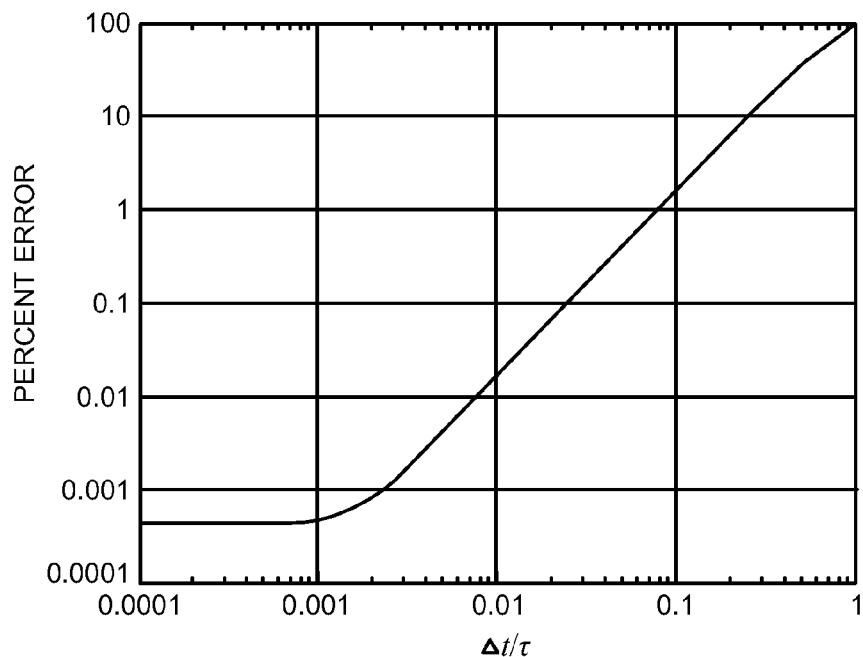
FIG. 21 shows data indicating how a percent error increases as a function of the time between pulses normalized by a period.

FIG. 21 shows how the percent error increases as a function of the time between pulses normalized by the period ($\Delta t^* = \Delta t/\tau$). In the illustrated example of FIG. 21, the percent error is calculated as the maximum difference between the prescribed and ultrasonic-measured heat flux ($q_{US}''$) normalized by the maximum flux ($q_{max}'' = 1$ MW/m$^2$) as shown in equation 30 below.

$$\% \text{ error} = 100 \times \max\left[\frac{q_p'' - q_{US}''}{q_{max}''}\right]$$

The curve plot of FIG. 21 facilitates determining the highest frequency of the heating load (e.g., the heating event 906 of FIG. 9) that is resolvable for a given time between acoustic pulses and to estimate the error associated with the measurement. As shown in FIG. 21, the value 0.3 is a less desirable choice of time between acoustic pulses ($\Delta t$) as it results in a percent error of about 20%.

Figure 22:
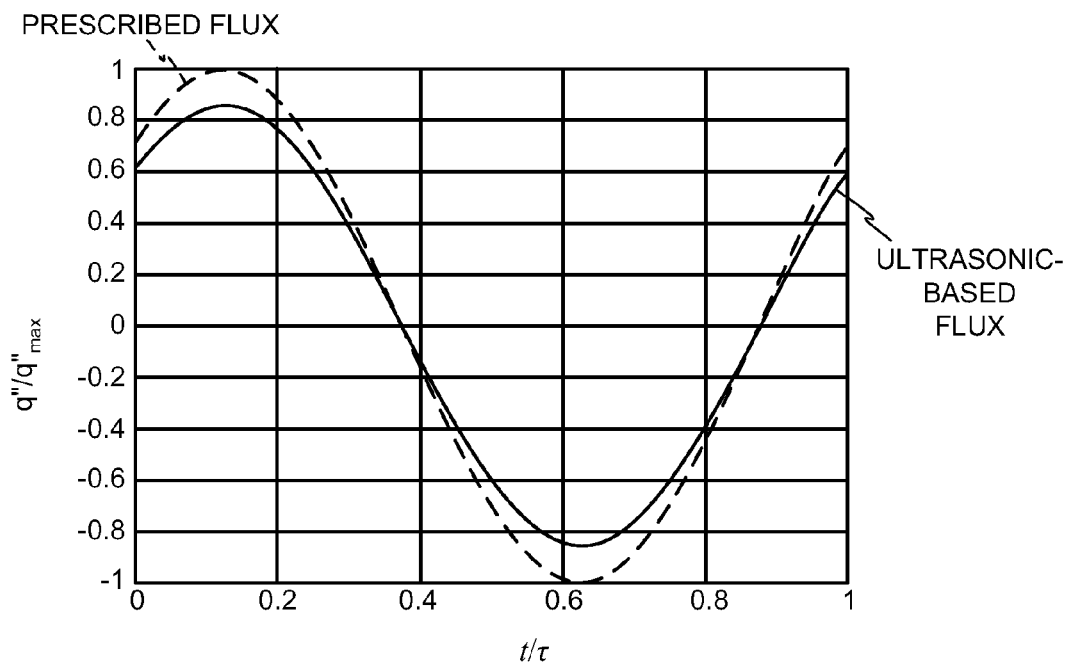
FIG. 22 shows the simulated flux estimate based on data obtained using an ultrasonic transducer compared to a prescribed heat flux.

FIG. 22 shows the simulated flux estimate based on data obtained using an ultrasonic transducer (e.g., the acoustic transducer 108 of FIGS. 1, 3, and 4) compared to the prescribed heat flux ($q_p''$). This comparison shows that although a heat flux determination based on ultrasonic sensor data results in a relatively lower estimate of the heat flux than the magnitude of the prescribed heat flux ($q_p''$), the ultrasonic-based heat flux determination consistently and uniformly follows the prescribed heat flux ($q_p''$). This indicates that heat flux can be relatively accurately and precisely measured using the ultrasonic techniques described herein. That is, the ultrasonic-based technique for directly determining heat flux as described above in connection with equations 17-25 is an effective remote sensing technology because the ultrasonic pulses sample entire temperature distributions instead of measuring single point temperatures (e.g., temperatures at surface boundaries). Thus, a change in propagation time from one ultrasonic pulse to the next is a measure of the stored energy in the measured medium. Knowing the other heat transfers in the measured medium (in particular, the generated and accessible surface boundary flux), an unknown heat flux can be calculated from an energy balance.

The above described techniques for determining heat flux can be implemented to be performed by the same monitoring system (e.g., the example temperature monitoring system 200 of FIG. 2) or can be implemented separately in two different systems. For example, the heat flux measuring technique involving a thermal model and inverse methods described above in connection with equations 2-13 can be implemented in the example temperature monitoring system 200. The heat flux measuring technique described above in connection with equations 17-25 that can be used to directly determine heat flux without requiring the estimation or determination of a local temperature of a heat flux boundary and without requiring use of a thermal model or inverse methods can be implemented using a separate monitoring system substantially similar or identical to the example monitoring system 200.

Figure 24:
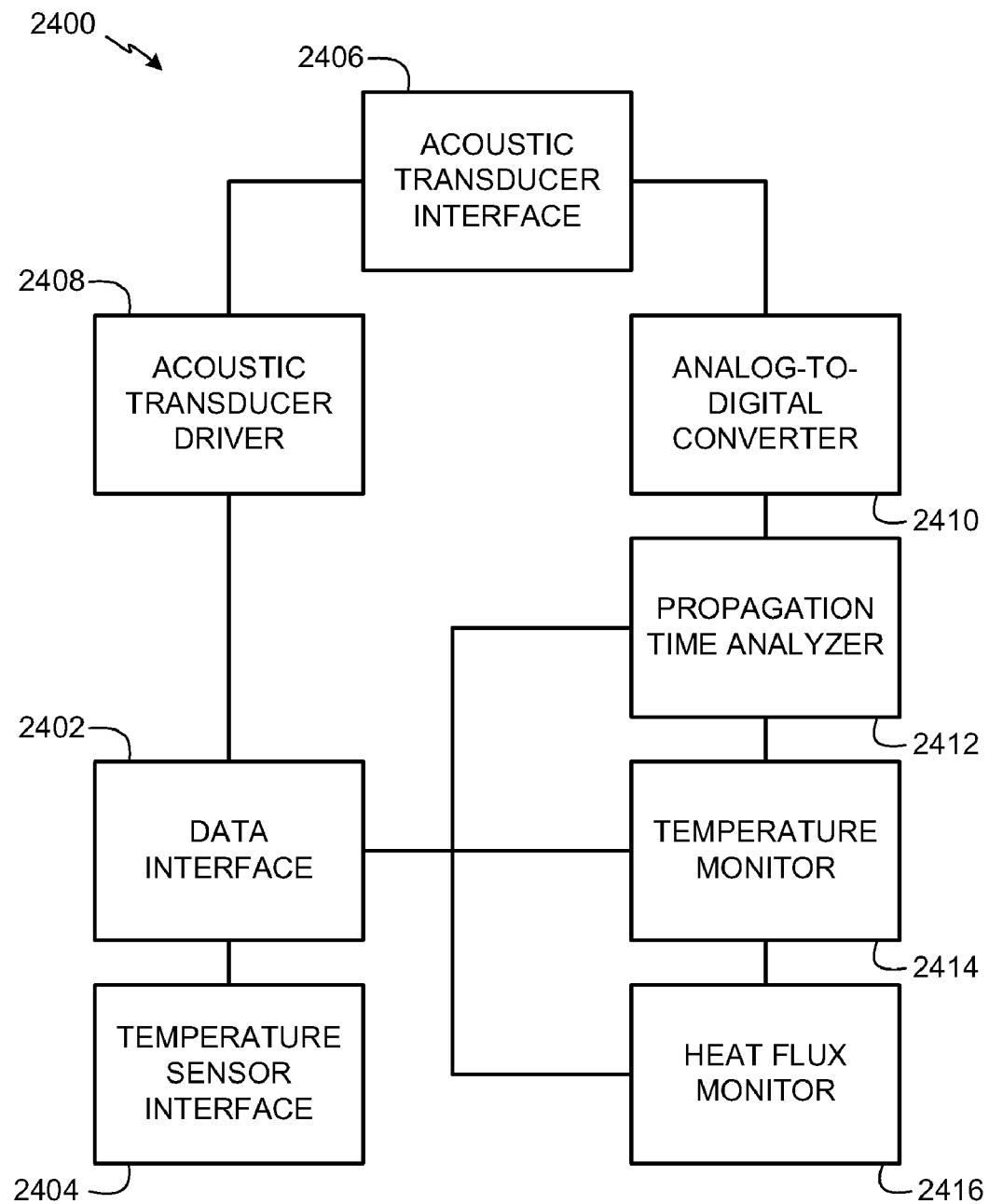
FIG. 24 is a block diagram of an example apparatus that may be used to implement the methods and apparatus described herein.

FIG. 24 is a block diagram of an example apparatus 2400 that may be used to implement the methods and apparatus described herein. In the illustrated example, the example apparatus is provided with a data interface 2402, a temperature sensor interface 2404, an acoustic transducer interface 2406, an acoustic transducer driver 2408, an analog-to-digital converter 2410, a propagation time analyzer 2412, a temperature monitor 2414, and a heat flux monitor 2416, all of which may be communicatively coupled as shown. The structures shown in FIG. 24 may be implemented using any desired combination of hardware, software, and/or firmware. Thus, for example, any of the data interface 2402, the temperature sensor interface 2404, the acoustic transducer interface 2406, the acoustic transducer driver 2408, the analog-to-digital converter 2410, the propagation time analyzer 2412, the temperature monitor 2414, and/or the heat flux monitor 2416, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc.

Figure 28:
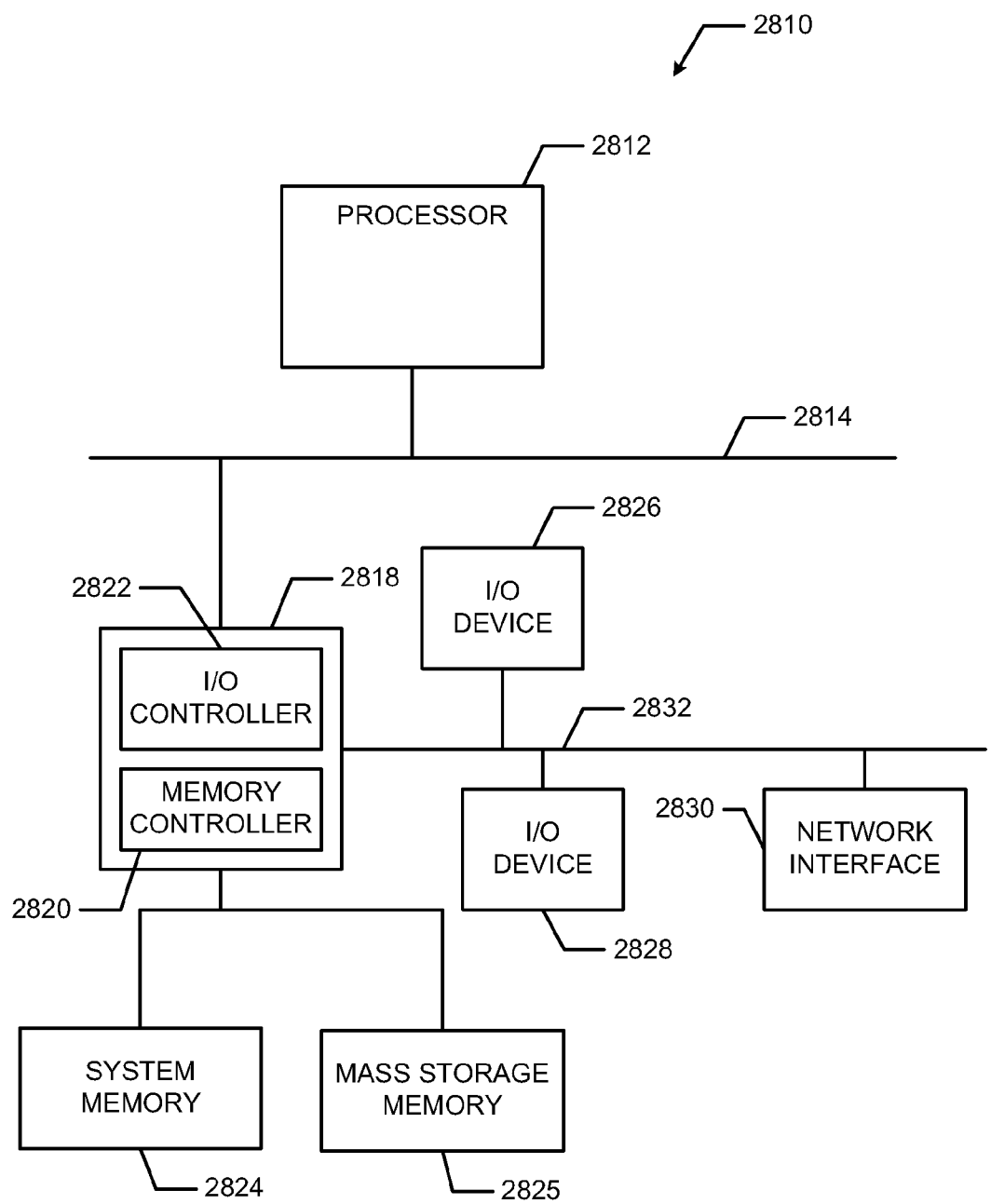
FIG. 28 is a block diagram of an example processor system that may be used to implement the example methods and apparatus described herein.

Some or all of the data interface 2402, the temperature sensor interface 2404, the acoustic transducer interface 2406, the acoustic transducer driver 2408, the analog-to-digital converter 2410, the propagation time analyzer 2412, the temperature monitor 2414, and/or the heat flux monitor 2416, or parts thereof, may be implemented using instructions, code, and/or other software and/or firmware, etc. stored on a machine accessible medium and executable by, for example, a processor system (e.g., the example processor system 2810 of FIG. 28). When any of the appended claims are read to cover a purely software implementation, at least one of the data interface 2402, the temperature sensor interface 2404, the acoustic transducer interface 2406, the acoustic transducer driver 2408, the analog-to-digital converter 2410, the propagation time analyzer 2412, the temperature monitor 2414, and/or the heat flux monitor 2416 is hereby expressly defined to include a tangible medium such as a memory, DVD, CD, etc.

In general, the example apparatus 2400 may be configured to determine and monitor local temperatures and/or heat flux conditions of materials. For example, the example apparatus 2400 may be used to implement the example temperature monitoring system 200 (FIG. 2) based on the example methods described below in connection with FIGS. 25-27 and sequences of operations implemented at least in part based on one or more of equations 1 through 30 discussed above.

The data interface 2402 may be configured to obtain and store calibration values and/or data constants (e.g., an acoustic velocity-expansion factor (P), propagation path length (L or $d_w$), the temperature coefficient of velocity change y, the thermal expansion coefficient (EB), the calibration temperature speed of sound ($V(\theta(x))$) represented by equation 10 above, the ultrasonic coefficient ($\xi$), etc.), and any other value associated with the example methods described herein such as, for example, propagation times, temperature values, etc. The data interface 2402 may be configured to communicate information to and receive information from the temperature and heat flux monitors 2414 and 2416. The data interface 2402 may also be configured to obtain triggers and timing event commands to coordinate operations in the example system 2400. For example, the data interface 2402 may be configured to trigger the acoustic transducer interface 2406 to cause the acoustic transducer 108 (FIGS. 1, 3, and 4) to emit acoustic signals or waves. Additionally, the data interface 2402 may also be configured to obtain temperature information from the temperature sensor interface 2404. The data interface 2402 may also be configured to communicate with another data processing system such as, for example, the processing system 208 of FIG. 2. In this manner, the data interface 2402 may communicate temperature and heat flux values to the processing system 208.

In the illustrated example, the temperature sensor interface 2404 is configured to be communicatively coupled to the temperature sensor 110 of FIGS. 1 and 2. The temperature sensor interface 2404 is configured to acquire information from the temperature sensor 110 indicative of local surface temperatures of the outer surface 106 of the chamber wall 102 (FIG. 1) and communicate those temperatures to the data interface 2402. Although one temperature sensor interface is shown, the example apparatus 2400 may include any number of temperature sensor interfaces.

In the illustrated example, the acoustic transducer interface 2406 configured to be communicatively coupled to the acoustic transducer 108 of FIG. 1 and configured to trigger the acoustic transducer 108 to emit acoustic signals or waves and detect acoustic signals or waves (e.g., echoes reflected by distal surfaces as discussed above in connection with FIGS. 3-8 and 23). Although one acoustic transducer interface is shown, the example apparatus 2400 may include any number of acoustic transducer interfaces. The acoustic transducer interface 2406 may be implemented using a transceiver-type interface and/or a separate emitter interface and receiver interface.

The acoustic transducer driver 2408 may be configured to generate electrical signals and cause the acoustic transducer interface 2406 to trigger the acoustic transducer 108 to emit acoustic signals or waves based on those electrical signals. The acoustic transducer driver 2408 may receive trigger events or timing events from the data interface 2402 indicating when to drive the acoustic transducer interface 2406. The acoustic transducer driver 2408 may be implemented using an ultrasonic transducer driver such as, for example, a 30 MHz or 50 MHz ultrasonic signal generator or any other ultrasonic signal generator.

The analog-to-digital converter (ADC) 2410 may be configured to obtain analog electrical signals from the acoustic transducer interface 2406 that correspond to acoustic waves or signals detected by the acoustic transducer interface 2406 (e.g., the echoes reflected by distal surfaces or features as discussed above in connection with FIGS. 3-8 and 23). Additionally, the ADC 2410 may convert the analog electrical signals to digital information (i.e., a digital representation of an acoustic wave) and communicate the digital information to the propagation time analyzer 2412. The ADC 2410 may be implemented using a high-speed digitization device such as, for example, a 1 gigahertz digitizer, a 5 gigahertz digitizer, etc.

The propagation time analyzer 2412 may be configured to obtain the digital information from the ADC 2410 that corresponds to acoustic signals or waves detected by the acoustic transducer interface 2406. The propagation time analyzer 2412 may generate timestamp information regarding reception of acoustic signals and may obtain emit timestamps based on acoustic pulse triggers from the data interface 2401 corresponding to acoustic signal trigger events that cause the acoustic transducer interface 2406 to trigger the acoustic transducer 108 to emit acoustic signals or waves. The propagation time analyzer 2412 may then determine propagation times based on the timestamp information. The propagation time analyzer 2412 may determine propagation times using any one or more of a number of known signal processing algorithms. For example, the propagation time analyzer 2412 may be configured to determine the propagation times using at least one of peak detection, cross-correlation, matched filter methods, and sweep frequency/inverse filtering methods (e.g., chirp). The propagation time analyzer 2412 may communicate the propagation times to the temperature and heat flux monitors 2414 and 2416.

The temperature monitor 2414 may be configured to determine local surface temperatures indicative of boundary temperature conditions at or near distal surfaces such as, for example, the inner surface 104 of the chamber wall 102 of FIGS. 1, 3, and 4 or any other structural feature described above in connection with FIGS. 3-8 and 23. These boundary temperature determinations may be based on the propagation times obtained from the propagation time analyzer 2412 and other values (e.g., calibration values and constant values) obtained from the data interface 2402. The temperature monitor 2414 may communicate temperature values to the data interface 2402.

The heat flux monitor 2416 may be configured to determine heat fluxes at or near distal surfaces (e.g., the structural features described above in connection with FIGS. 3-8 and 23) or any other portion of measured materials based on the propagation times obtained from the propagation time analyzer 2412 and other values (e.g., calibration values and constant values) obtained from the data interface 2102. The heat flux monitor 2416 may communicate heat flux values to the data interface 2402.

Figure 25:
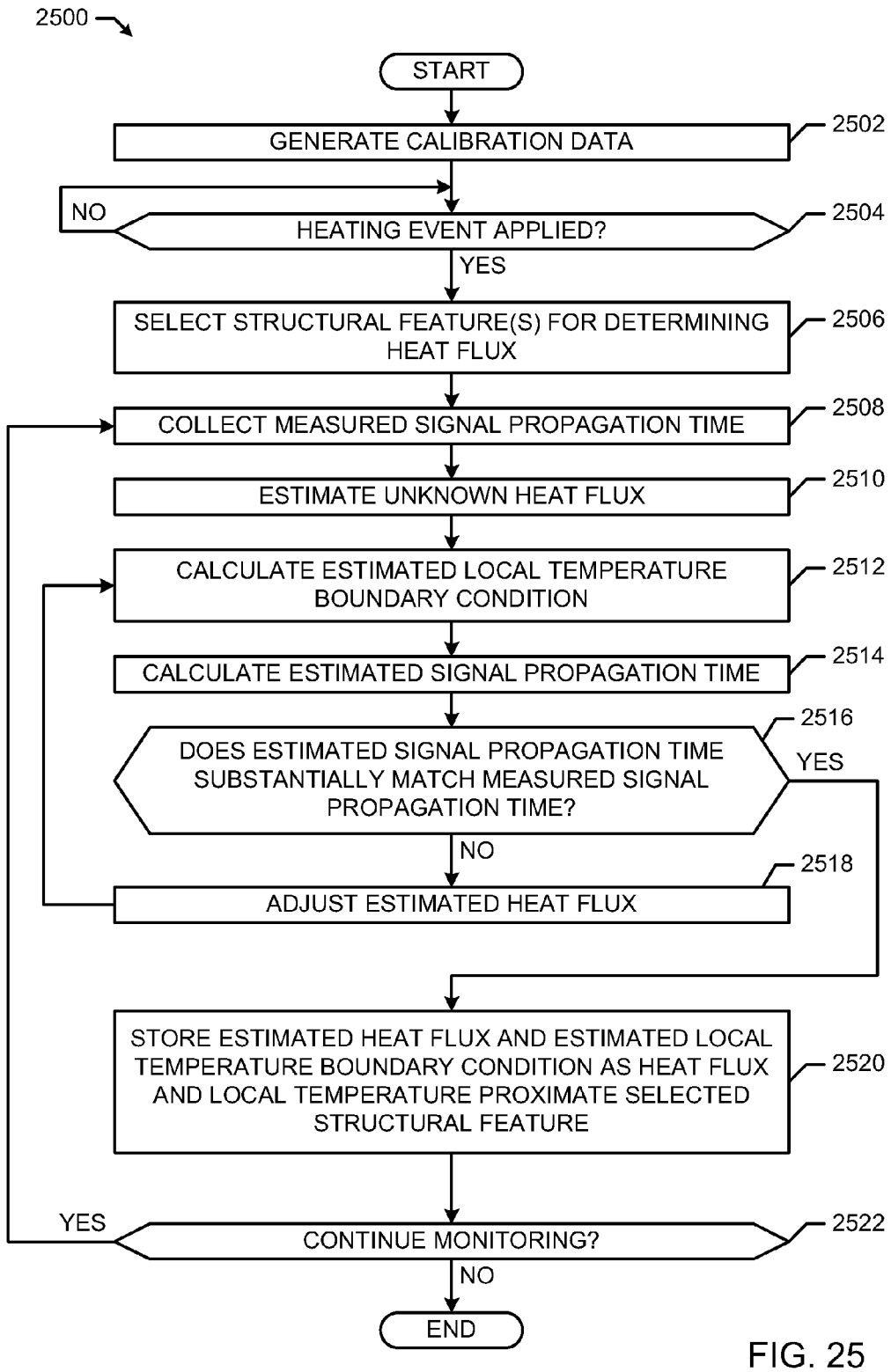
FIG. 25 is a flow diagram representative of example machine readable instructions that may be executed to determine local temperatures and heat fluxes associated with selected features in measured mediums based on the thermal model and inverse techniques.
Figure 26:
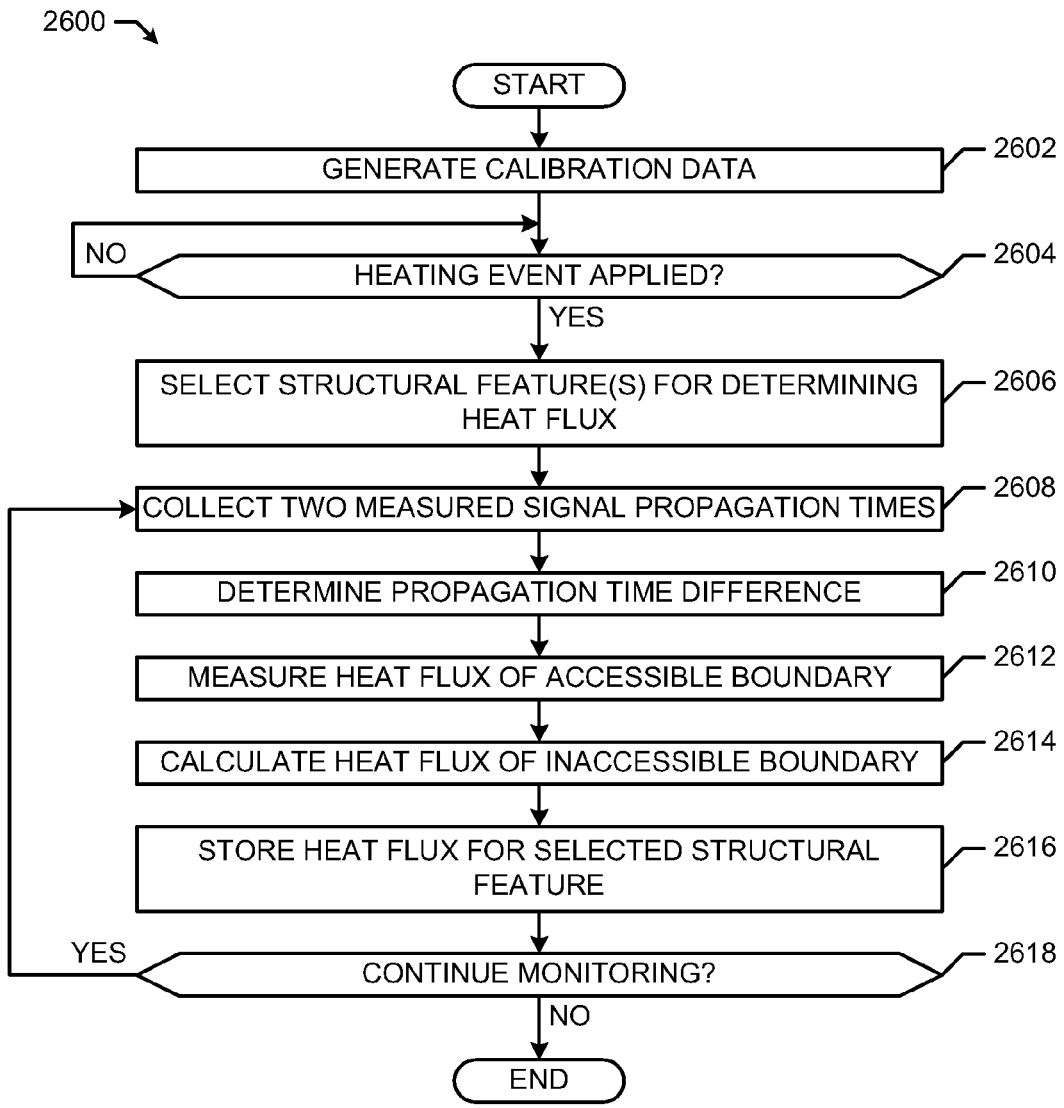
FIG. 26 is a flow diagram representative of example machine readable instructions that may be executed to determine heat fluxes associated with selected features in measured mediums based on the direct calculation techniques.
Figure 27:
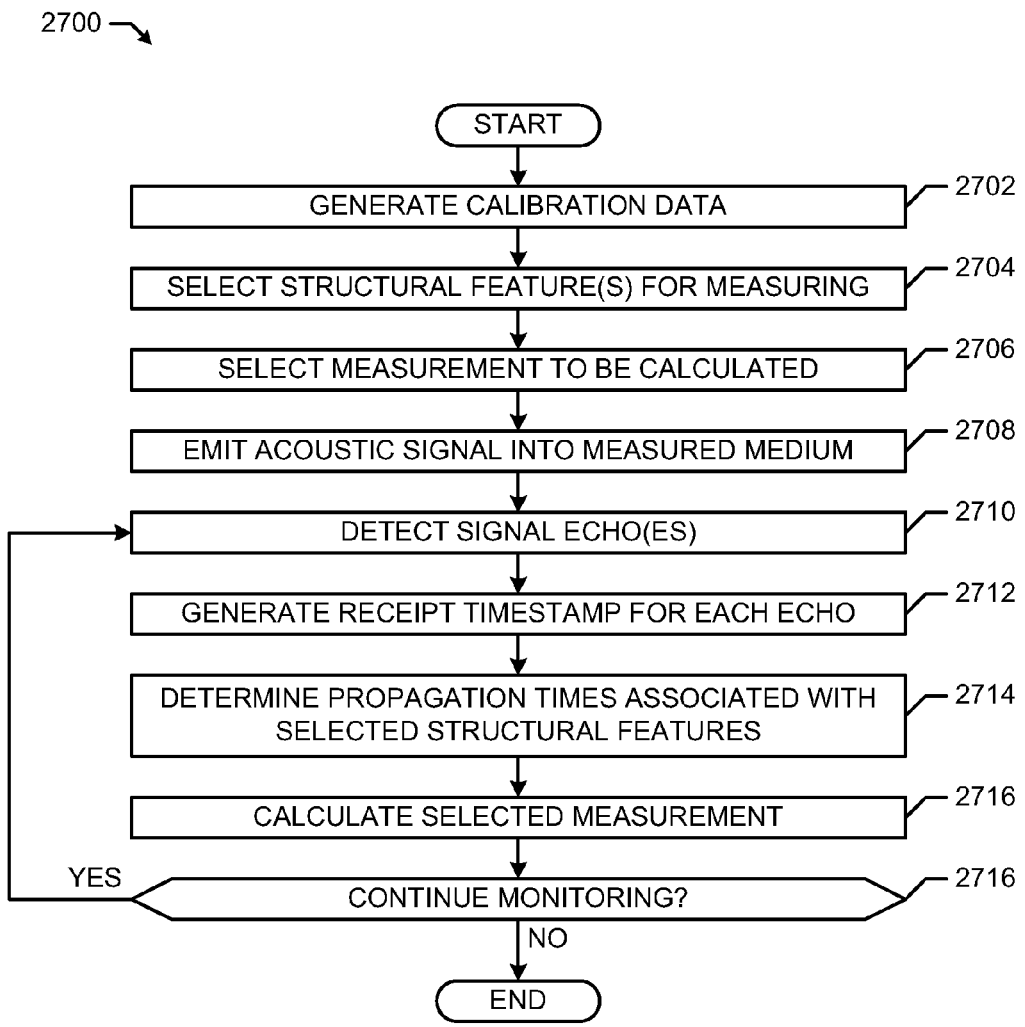
FIG. 27 is a flow diagram representative of example machine readable instructions that may be executed to measure propagation times of acoustic signals emitted into measured mediums.

Flow diagrams depicted in FIGS. 25-27 are representative of machine readable and executable instructions or processes that can be executed to implement the example temperature monitoring system 200 and the processor system 208 of FIG. 2 and the example apparatus 2400 of FIG. 24. The example processes of FIGS. 25-27 may be performed using a processor, a controller and/or any other suitable processing device. For example, the example processes of FIGS. 25-27 may be implemented in coded instructions stored on a tangible medium such as a flash memory, a read-only memory (ROM) and/or random-access memory (RAM) associated with a processor. Alternatively, some or all of the example processes of FIGS. 25-27 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 25-27 may be implemented manually or as any combination(s) of any of the foregoing techniques, for example, any combination of firmware, software, discrete logic and/or hardware. Further, although the example processes of FIGS. 25-27 are described with reference to the flow diagrams of FIGS. 25-27, other methods of implementing the processes of FIGS. 25-27 may be employed. For example, the order of execution of the blocks may be changed, and/or some of the blocks described may be changed, eliminated, subdivided, or combined. Additionally, any or all of the example processes of FIGS. 25-27 may be performed sequentially and/or in parallel by, for example, separate processing threads, processors, devices, discrete logic, circuits, etc.

Turning to FIG. 25, the illustrated flow diagram is representative of an example method 2500 that can be used to determine local temperatures and heat fluxes associated with selected features (e.g., surfaces, channels, passageways, cooling fluids, etc.) in measured mediums based on the thermal model and inverse methods discussed above in connection with equations 2-13. The example method 2500 is described in connection with the example apparatus 2400 of FIG. 24, which as discussed above can be used to implement the example temperature monitoring system 200 of FIG. 2. Initially, the example apparatus 2400 generates calibration data (block 2502). The calibration data involves generating a calibration curve by measuring propagation times at various steady-state temperatures and plotting the propagation times versus the temperature values to determine the slope of the curve represented by the acoustic velocity-expansion factor (P) discussed above in connection with equation 10. The steady-state temperatures can be measured using the temperature sensor 110 of FIGS. 1 and 2 as the temperature of an accessible surface (e.g., the outer surface 106 of FIGS. 1, 3, and 4) will be the same temperature throughout the measured structure due to the measured structure being in an isothermal condition.

The example apparatus 2400 then determines whether a heating event (e.g., the heating event 906 of FIG. 9) of interest has been applied to the measured structure (block 2504). For example, the heating event may be detected by configuring the propagation time analyzer 2412 to generate an interrupt or alert whenever it detects a notable change in time between two or more consecutively measured propagation times, which would indicate a change in temperature in the measured structure. The example apparatus 2400 can continue to monitor at block 2504 until it detects a heating event. When the propagation time analyzer 2412 detects a heating event, the data interface 2402 selects one or more structural features for determining heat flux (block 2506). For example, referring to FIGS. 4-8 and 23, the measured structure may have one or more features of interest (e.g., internal surfaces, recess surfaces, channels, passageways, material layer interfaces, etc.) for which heat fluxes may be determined. The data interface 2402 can be configured to select the features of interest based on user input provided by a user or based on information stored in a configuration file indicating which signal echo or echoes to measure.

The propagation time analyzer 2412 collects a measured signal propagation time (G) (block 2508). The measured signal propagation time (G) could be a propagation time of a single emitted acoustic signal reflected by the selected feature or could be a propagation time calculated by measuring the signal propagation times of two signals/echoes and subtracting the times to determine a propagation time through a particular selected feature such as the rifling element 804 of FIG. 8 or a cooling fluid through the passageway 602 of FIG. 6.

The heat flux monitor 2416 then estimates an unknown heat flux ($\hat{q}$) (block 2510). At block 2510, the unknown heat flux ($\hat{q}$) is the heat flux at or proximate the structural feature selected at block 2506. The temperature monitor 2414 then calculates the estimated local temperature boundary condition ($\theta(x)$) of the selected structural feature (block 2512) based on the estimated heat flux ($\hat{q}$) using equation 4 discussed above. In equation 4, the distance (x) is equal to the distance between the acoustic transducer 108 and the selected features such that if the selected feature is the inner surface 104 of FIGS. 1, 3, and 4, the distance (x) is equal to the wall depth $d_w$. The propagation time analyzer 2412 then calculates an estimated signal propagation time ($\hat{G}$) (block 2514) based on the estimated local temperature boundary condition ($\theta(x)$) using equations 9 and 10 discussed above.

The propagation time analyzer 2412 then compares the estimated signal propagation time ($\hat{G}$) to the measured signal propagation time (G) collected at block 2508 to determine whether they substantially match (block 2516) within, for example, a threshold tolerance. If the values do not substantially match (block 2516), the heat flux monitor 2416 adjusts the estimated heat flux value ($\hat{q}$) (block 2518) and control returns to block 2512. For example, the estimated heat flux value ($\hat{q}$) can be adjusted to be a relatively smaller or a relatively larger value based on the sign and the magnitude of the difference value (S) shown in equation 11 above. However, if the estimated signal propagation time ($\hat{G}$) substantially matches the measured signal propagation time (G), control advances to block 2520 and the data interface 2402 stores the estimated heat flux value ($\hat{q}$) and the estimated local temperature boundary condition ($\theta(x)$) as the heat flux and the local temperature at or proximate to the structural feature selected at block 2506 (block 2520). The data interface 2402 can store the values in a memory such as, for example, one or both of the memories 2824 and 2825 of FIG. 28.

The example apparatus 2400 then determines whether to continue monitoring (block 2522). For example, the example apparatus 2400 can stop or continue to monitor based on a user input command instructing the example apparatus 2400. Alternatively, the example apparatus 2400 can determine to stop monitoring if the measured heat flux has stayed in a steady-state based on a series of previous heat flux measurements in which case the final, steady-state heat flux of the selected feature is known. If the example apparatus 2400 determines that it should continue to monitor the measured material, control returns to block 2508. During subsequent iterations of blocks 2508, 2510, 2512, 2514, and 2516, the estimated unknown heat flux at block 2510 can be set to the estimated heat flux stored at block 2520 as it provides a relatively good or close approximation of what the subsequent heat flux will be when the measured material is undergoing a temperature rise. When the example apparatus 2400 determines that it should not continue to monitor (block 2522), the example method of FIG. 25 is ended.

Turning to FIG. 26, the illustrated flow diagram is representative of an example method 2600 that can be used to determine heat fluxes associated with selected features (e.g., surfaces, channels, passageways, cooling fluids, etc.) in measured mediums based on the direct calculation techniques discussed above in connection with equations 17-25. The example method 2600 is described in connection with the example apparatus 2400 of FIG. 24, which as discussed above can be used to implement the example temperature monitoring system 200 of FIG. 2. Initially, the example apparatus 2400 generates calibration data (block 2602) as discussed above in connection with the operation of block 2502 of FIG. 25.

The example apparatus 2400 then determines whether a heating event (e.g., the heating event 906 of FIG. 9) of interest has been applied to the measured structure (block 2604). For example, the heating event may be detected by configuring the propagation time analyzer 2412 to generate an interrupt or alert whenever it detects a notable change in time between two or more consecutively measured propagation times, which would indicate a change in temperature in the measured structure. The example apparatus 2400 can continue to monitor at block 2604 until it detects a heating event. When the propagation time analyzer 2412 detects a heating event, the data interface 2402 selects one or more structural features for determining heat flux (block 2606) as discussed above in connection with the operation of block 2506 of FIG. 5.

The propagation time analyzer 2412 collects two measured signal propagation times ($G_1$ and $G_2$) (block 2608) as described above in connection with the operation of block 2508 of FIG. 25. At block 2608, the two measured signal propagation times are associated with the same selected feature and are associated with acoustic signals emitted by the acoustic transducer 108 at temporally spaced instances. For example, at a first time (t1) the propagation time analyzer 2412 can collect the first measured propagation time ($G_1$) corresponding to an acoustic signal traveling through the chamber wall 102 FIGS. 1, 3, and 4 and at a second time (t2) can collect the second measured propagation time ($G_2$) for a subsequent acoustic signal traveling through the rifling element 804. Because the rifling element 804 is undergoing a change in temperature, the first and second acoustic propagation times ($G_1$ and $G_2$) will be different.

The propagation time analyzer 2412 then determines a propagation time difference ($\Delta G$) (block 2610) by subtracting the first measured propagation time ($G_1$) from the second measured propagation time ($G_2$). The heat flux monitor 2516 then measures a heat flux of an accessible boundary ($q_L''$) (block 2612) using any known direct heat flux measurement technique. For example, in the illustrated example of FIG. 1, the heat flux monitor 2516 can measure the accessible heat flux ($q_L''$) of the outer surface 106 using the temperature sensor 110 or any other heat flux measuring sensor.

The heat flux monitor 2416 then determines the inaccessible heat flux ($q_0''$) (block 2614) based on the propagation time difference ($\Delta G$) and the accessible heat flux ($q_L''$) using equation 25 discussed above.

The data interface 2402 stores the inaccessible heat flux value ($q_0''$) as the heat flux at or proximate to the structural feature selected at block 2606 (block 2616) in a memory such as, for example, one or both of the memories 2824 and 2825 of FIG. 28.

The example apparatus 2400 then determines whether to continue monitoring (block 2618). For example, the example apparatus 2400 can stop or continue to monitor based on a user input command instructing the example apparatus 2400. Alternatively, the example apparatus 2400 can determine to stop monitoring if the measured heat flux has stayed in a steady-state based on a series of previous heat flux measurements in which case the final, steady-state heat flux of the selected feature is known. If the example apparatus 2400 determines that it should continue to monitor the measured material, control returns to block 2608. When the example apparatus 2400 determines that it should not continue to monitor (block 2618), the example method of FIG. 26 is ended.

FIG. 27 is a flow diagram representative of example machine readable instructions that may be executed to measure propagation times of acoustic signals emitted into measured mediums having one or more structural features (e.g., surfaces, channels, passageways, cooling fluids, etc.). Initially, the example apparatus 2400 generates calibration data (block 2702) as discussed above in connection with the operation of block 2502 of FIG. 25. The data interface 2402 selects one or more structural features for performing measurements (block 2706) as discussed above in connection with the operation of block 2506 of FIG. 5.

The data interface 2402 then selects one or more parameter measurements to be calculated (block 2706). For example, the data interface 2402 could select to calculate local temperatures and/or heat fluxes at or proximate the one or more features selected at block 2704. The acoustic transducer driver 2408 then generates a signal to cause the acoustic transducer 108 (FIGS. 1, 3, and 4) to emit an acoustic signal into the measured medium (block 2708). The measured medium could be, for example, the chamber wall 102 of FIGS. 1, 3, and 4 or the gun barrel wall 808 of FIG. 8.

The acoustic transducer interface 2406 then detects one or more signal echoes (block 2710) caused by the structural features selected at block 2704 reflecting the signals emitted by the acoustic transducer 108. The propagation time analyzer 2412 generates receipt timestamps for each of the detected echoes (block 2712) and stores the receipt timestamps in association with emission timestamps indicative of when the acoustic transducer 108 emitted the acoustic signals in connection with block 2708. The propagation time analyzer 2412 then determines propagation times associated with the selected structural features based on the emission and receipt timestamps as described above in connection with FIGS. 4, 6, 7, 8, and 23. The temperature monitor 2414 and/or the heat flux monitor 2416 then calculate the measurements selected at block 2706 (block 2716). For example, the temperature monitor 2414 and/or the heat flux monitor 2416 can implement the calculation techniques described above in connection with the flow diagrams of FIGS. 25 and 26 to determine local temperatures and/or heat fluxes.

The example apparatus 2400 then determines whether to continue monitoring (block 2716). For example, the example apparatus 2400 can stop or continue to monitor based on a user input command instructing the example apparatus 2400. Alternatively, the example apparatus 2400 can determine to stop monitoring if the measured heat flux has stayed in a steady-state based on a series of previous heat flux measurements in which case the final, steady-state heat flux of the selected feature is known. If the example apparatus 2400 determines that it should continue to monitor the measured material, control returns to block 2710. When the example apparatus 2400 determines that it should not continue to monitor (block 2716), the example method of FIG. 27 is ended.

FIG. 28 is a block diagram of an example processor system 2810 that may be used to implement the apparatus and methods described herein. As shown in FIG. 28, the processor system 2810 includes a processor 2812 that is coupled to an interconnection bus 2814. The processor 2812 may be any suitable processor, processing unit or microprocessor. Although not shown in FIG. 28, the system 2810 may be a multi-processor system and, thus, may include one or more additional processors that are identical or similar to the processor 2812 and that are communicatively coupled to the interconnection bus 2814.

The processor 2812 of FIG. 28 is coupled to a chipset 2818, which includes a memory controller 2820 and an input/output (I/O) controller 2822. As is well known, a chipset typically provides I/O and memory management functions as well as a plurality of general purpose and/or special purpose registers, timers, etc. that are accessible or used by one or more processors coupled to the chipset 2818. The memory controller 2820 performs functions that enable the processor 2812 (or processors if there are multiple processors) to access a system memory 2824 and a mass storage memory 2825.

The system memory 2824 may include any desired type of volatile and/or non-volatile memory such as, for example, static random access memory (SRAM), dynamic random access memory (DRAM), flash memory, read-only memory (ROM), etc. The mass storage memory 2825 may include any desired type of mass storage device including hard disk drives, optical drives, tape storage devices, etc.

The I/O controller 2822 performs functions that enable the processor 2812 to communicate with peripheral input/output (I/O) devices 2826 and 2828 and a network interface 2830 via an I/O bus 2832. The I/O devices 2826 and 2828 may be any desired type of I/O device such as, for example, a keyboard, a video display or monitor, a mouse, etc. The network interface 2830 may be, for example, an Ethernet device, an asynchronous transfer mode (ATM) device, an 802.11 device, a DSL modem, a cable modem, a cellular modem, etc. that enables the processor system 2810 to communicate with another processor system.

While the memory controller 2820 and the I/O controller 2822 are depicted in FIG. 28 as separate functional blocks within the chipset 2818, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed:

1. A method of measuring heat flux in a material, comprising:
   emitting an acoustic signal into the material;
   determining a first propagation time associated with the propagation of the acoustic signal through the material; and
   determining a first heat flux value indicative of a first heat flux of the material based on the first propagation time.

2. A method as defined in claim 1, wherein the first propagation time is indicative of a first duration required for the acoustic signal to travel from an acoustic transducer to a feature in the material added to a second duration required for an echo associated with the acoustic signal to travel from the feature to the acoustic transducer.

3. A method as defined in claim 2, wherein the feature is at least one of a bore surface of the material, a passageway formed in the material, or a channel formed on an internal surface of the material.

4. A method as defined in claim 1, wherein emitting the acoustic signal into the material comprises emitting the acoustic signal from a first feature of the material toward a second feature of the material, wherein the first heat flux is located at or proximate the second feature of the material.

5. A method as defined in claim 4, wherein the first feature is accessible for direct measurement, wherein the second feature is non-accessible for direct measurement, and wherein the second heat flux value is measured using a thermocouple engaging the first surface.

6. A method as defined in claim 1, further comprising measuring a temperature value of the material via a Thermocouple, wherein determining the first heat flux value comprises determining the first heat flux value based on the temperature value.

7. A method as defined in claim 1, wherein the acoustic signal is an ultrasonic signal.

8. A method as defined in claim 1, further comprising:
   receiving a first echo associated with the acoustic signal reflecting from a first feature of the structure;
   receiving second and third echoes, the second echo associated with the acoustic signal reflecting from a second feature of the structure and the third echo associated with the acoustic signal reflecting from a third feature of the structure;
   determining a first local temperature of a first region of the structure between the first and second features of the structure based on the first and second echoes; and
   determining a second local temperature of a second region of the structure between the second and third features based on the second and third echoes.

9. A method as defined in claim 8, wherein the first and second features comprise at least one of a passageway formed in the material or a channel formed on an internal surface of the material.

10. A method of measuring heat flux and local temperature in a material, comprising:
    measuring a first heat flux value indicative of a heat flux associated with a first surface of a material;
    emitting first and second acoustic signals into the material;
    determining a propagation time difference value indicative of the difference between a first propagation time of the first acoustic signal between the first surface of the material and a second surface of the material and a second propagation time of the second acoustic signal between the first surface and the second surface; and
    determining a second heat flux value indicative of a heat flux associated with the second surface based on the propagation time difference value and the first heat flux value.

11. A method as defined in claim 10, further comprising determining the second heat flux value based on an ultrasonic coefficient associated with a temperature coefficient of velocity change and a linear coefficient of thermal expansion.

12. A method as defined in claim 10, wherein emitting the first and second acoustic signals further comprises emitting the first acoustic signal at a first emission time and emitting the second acoustic signal at a second emission time.

13. A method as defined in claim 10, wherein the first and second acoustic signals are ultrasonic signals.

14. A method as defined in claim 10, wherein the first and second surfaces are opposing surfaces of a passageway formed in the material.

15. A method as defined in claim 10, wherein the heat flux associated with the second surface is a heat flux of a cooling fluid flowing adjacent the second surface.

16. A method as defined in claim 10, wherein a heat source is directly applied to the second surface of the material but not the first surface.

17. A method of measuring heat flux and local temperature in a material, comprising:
    measuring a signal propagation time of an acoustic signal emitted into the material;
    determining an estimated heat flux value associated with a structural feature of the material;

determining a local temperature value relative to a reference temperature associated with the structural feature of the material;

determining an estimated signal propagation time based on the local temperature value; and when the signal propagation time substantially matches the estimated signal propagation time, storing the estimated heat flux value as the heat flux associated with the structural feature.

18. A method as defined in claim 17, wherein determining the local temperature value further comprises determining the local temperature value based on an estimated heat flux value at or proximate to the structural feature.

19. A method as defined in claim 17, further comprising when the signal propagation time does not substantially match the estimated signal propagation time, adjusting the estimated heat flux value and determining another local temperature value and another estimated signal propagation time based on the adjusted estimated heat flux value.

20. A method as defined in claim 17, wherein the acoustic signal is an ultrasonic signal.

21. A method as defined in claim 17, wherein measuring the signal propagation time of the acoustic signal emitted into the material comprises emitting the acoustic signal using an ultrasonic transducer and detecting via the ultrasonic transducer an echo caused by the structural feature reflecting the acoustic signal.

22. A method as defined in claim 17, wherein the structural feature is one of an inner inaccessible surface of the material, a material layer interface, or a passageway feature in the material.

23. A method as defined in claim 17, further comprising generating calibration data associating measured propagation times with corresponding temperature values collected by direct temperature measurements of the material and determining the local temperature value based on the calibration data.

24. A method as defined in claim 17, wherein a heat source is directly applied to the structural feature of the material but not a surface of the material from which the acoustic signal is emitted into the material.

25. A method as defined in claim 17, wherein the material forms one of a fuel chamber or a gun barrel.

26. An apparatus to measure heat flux and local temperature in a material, comprising:

an acoustic transducer interface to emit first and second acoustic signals into a material;

a propagation time analyzer to determine a propagation time difference value indicative of the difference between a first propagation time of the first acoustic signal between a first surface of the material and a second surface of the material and a second propagation time of the second acoustic signal between the first surface and the second surface; and a heat flux monitor to measure a first heat flux value indicative of a heat flux associated with the first surface of the material and determine a second heat flux value indicative of a heat flux associated with the second surface based on the propagation time difference value and the first heat flux value.

27. An apparatus as defined in claim 26, wherein the heat flux monitor is further to determine the second heat flux value based on an ultrasonic coefficient associated with a temperature coefficient of velocity change and a linear coefficient of thermal expansion.

28. An apparatus as defined in claim 26, wherein emitting the first and second acoustic signals further comprises emitting the first acoustic signal at a first emission time and emitting the second acoustic signal at a second emission time.

29. An apparatus as defined in claim 26 wherein the heat flux associated with the second surface is a heat flux of a cooling fluid flowing adjacent the second surface.

30. A tangible machine accessible storage medium having instructions stored thereon that, when executed, cause a machine to at least:

measure a first heat flux value indicative of a heat flux associated with a first surface of a material;

emit first and second acoustic signals into the material;

determine a propagation time difference value indicative of the difference between a first propagation time of the first acoustic signal between the first surface of the material and a second surface of the material and a second propagation time of the second acoustic signal between the first surface and the second surface; and determine a second heat flux value indicative of a heat flux associated with the second surface based on the propagation time difference value and the first heat flux value.

31. A machine accessible medium as defined in claim 30 having instructions stored thereon that, when executed, cause the machine to determine the second heat flux value based on an ultrasonic coefficient associated with a temperature coefficient of velocity change and a linear coefficient of thermal expansion.

32. A machine accessible medium as defined in claim 30, wherein emitting the first and second acoustic signals further comprises emitting the first acoustic signal at a first emission time and emitting the second acoustic signal at a second emission time.

33. A machine accessible medium as defined in claim 30, wherein the heat flux associated with the second surface is a heat flux of a cooling fluid flowing adjacent the second surface.

34. An apparatus to measure heat flux in a material, comprising:

an acoustic transducer interface to emit an acoustic signal into the material;

a propagation time analyzer to determine a first propagation time associated with the propagation of the acoustic signal through the material; and a heat flux monitor to determine a first heat flux value indicative of a first heat flux of the material based on the first propagation time.

35. An apparatus as defined in claim 34 further comprising a second acoustic transducer interface to emit a second acoustic signal into the material at a second portion of the material different from a first portion of the material at which the acoustic transducer interface emits the acoustic signal into the material.

36. An apparatus as defined in claim 34, wherein the first propagation time is indicative of a first duration required for the acoustic signal to travel from an acoustic transducer to a feature in the material added to a second duration required for an echo associated with the acoustic signal to travel from the feature to the acoustic transducer.

37. An apparatus as defined in claim 36, wherein the feature is at least one of a bore surface of the material, a passageway formed in the material, or a channel formed on an internal surface of the material.

38. An apparatus as defined in claim 34, wherein the acoustic transducer interface is to emit the acoustic signal into the material by emitting the acoustic signal from a first feature of the material toward a second feature of the material, wherein the first heat flux is located at or proximate the second feature of the material.

39. An apparatus as defined in claim 38, wherein the first feature is accessible for direct measurement, wherein the second feature is non-accessible for direct measurement, and wherein the second heat flux value is measured using a thermocouple engaging the first surface.

40. An apparatus as defined in claim 34, further comprising a temperature monitor to measure a temperature value of the material via a thermocouple, wherein the heat flux monitor is to determine the first heat flux value based on the temperature value.

41. An apparatus as defined in claim 34, wherein the acoustic signal is an ultrasonic signal.

42. An apparatus as defined in claim 34, wherein the acoustic transducer interface is further to:
receive a first echo associated with the acoustic signal reflecting from a first feature of the structure, and
receive second and third echoes, the second echo associated with the acoustic signal reflecting from a second feature of the structure and the third echo associated with the acoustic signal reflecting from a third feature of the structure; and
further comprising a temperature monitor to:
determine a first local temperature of a first region of the structure between the first and second features of the structure based on the first and second echoes, and
determine a second local temperature of a second region of the structure between the second and third features based on the second and third echoes.

43. An apparatus as defined in claim 42, wherein the first and second features comprise at least one of a passageway formed in the material or a channel formed on an internal surface of the material.

44. A tangible machine accessible storage medium having instructions stored thereon that, when executed, cause a machine to at least:
emit an acoustic signal into the material;
determine a first propagation time associated with the propagation of the acoustic signal through the material; and
determine a first heat flux value indicative of a first heat flux of the material based on the first propagation time.

45. A machine accessible medium as defined in claim 44, wherein the first propagation time is indicative of a first duration required for the acoustic signal to travel from an acoustic transducer to a feature in the material added to a second duration required for an echo associated with the acoustic signal to travel from the feature to the acoustic transducer.

46. A machine accessible medium as defined in claim 45, wherein the feature is at least one of a bore surface of the material, a passageway formed in the material, or a channel formed on an internal surface of the material.

47. A machine accessible medium as defined in claim 44 having instructions stored thereon that, when executed, cause the machine to emit the acoustic signal into the material by emitting the acoustic signal from a first feature of the material toward a second feature of the material, wherein the first heat flux is located at or proximate the second feature of the material.

48. A machine accessible medium as defined in claim 47, wherein the first feature is accessible for direct measurement, wherein the second feature is non-accessible for direct measurement, and wherein the second heat flux value is measured using a thermocouple engaging the first surface.

49. A machine accessible medium as defined in claim 44 having instructions stored thereon that, when executed, cause the machine to measure a temperature value of the material via a thermocouple, wherein determining the first heat flux value comprises determining the first heat flux value based on the temperature value.

50. A machine accessible medium as defined in claim 44, wherein the acoustic signal is an ultrasonic signal.

51. A machine accessible medium as defined in claim 44 having instructions stored thereon that, when executed, cause the machine to:
receive a first echo associated with the acoustic signal reflecting from a first feature of the structure;
receive second and third echoes, the second echo associated with the acoustic signal reflecting from a second feature of the structure and the third echo associated with the acoustic signal reflecting from a third feature of the structure;
determine a first local temperature of a first region of the structure between the first and second features of the structure based on the first and second echoes; and
determine a second local temperature of a second region of the structure between the second and third features based on the second and third echoes.

52. A machine accessible medium as defined in claim 51, wherein the first and second features comprise at least one of a passageway formed in the material or a channel formed on an internal surface of the material.

53. An apparatus to measure heat flux and local temperature in a material, comprising:
a heat flux monitor to determine an estimated heat flux value associated with a structural feature of the material;
a temperature monitor to determine a local temperature value relative to a reference temperature associated with the structural feature of the material;
a propagation time analyzer to measure a signal propagation time of an acoustic signal emitted into the material, and determine an estimated signal propagation time based on the local temperature value; and
a data interface to store the estimated heat flux value as the heat flux associated with the structural feature when the signal propagation time substantially matches the estimated signal propagation time.

54. An apparatus as defined in claim 53, wherein the temperature monitor is to determine the local temperature value based on an estimated heat flux value at or proximate to the structural feature.

55. An apparatus as defined in claim 53, wherein the heat flux monitor is further to adjust the estimated heat flux value, the temperature monitor is further to determine another local temperature value, and the propagation time analyzer is further to determine another estimated signal propagation time based on the adjusted estimated heat flux value when the signal propagation time does not substantially match the estimated signal propagation time.

56. An apparatus as defined in claim 53, wherein the acoustic signal is an ultrasonic signal.

57. An apparatus as defined in claim 53, further comprising an acoustic transducer interface to emit the acoustic signal and detect an echo caused by the structural feature reflecting the acoustic signal, wherein the propagation time analyzer is to measure the signal propagation time of the acoustic signal emitted into the material based on the detection of the echo.

58. An apparatus as defined in claim 53, wherein the structural feature is one of an inner inaccessible surface of the material, a material layer interface, or a passageway feature in the material.

59. An apparatus as defined in claim 53, wherein the temperature monitor is to determine the local temperature value based on calibration data associating measured propagation times with corresponding temperature values collected by direct temperature measurements of the material.

60. An apparatus as defined in claim 53, wherein a heat source is directly applied to the structural feature of the material but not a surface of the material from which the acoustic signal is emitted into the material.

61. An apparatus as defined in claim 53, wherein the material forms one of a fuel chamber or a gun barrel.

62. A tangible machine accessible storage medium having instructions stored thereon that, when executed, cause a machine to at least:
   measure a signal propagation time of an acoustic signal emitted into the material;
   determine an estimated heat flux value associated with a structural feature of the material;
   determine a local temperature value relative to a reference temperature associated with the structural feature of the material;
   determine an estimated signal propagation time based on the local temperature value; and
   when the signal propagation time substantially matches the estimated signal propagation time, store the estimated heat flux value as the heat flux associated with the structural feature.

63. A machine accessible medium as defined in claim 62 having instructions stored thereon that, when executed, cause the machine to determine the local temperature value based on an estimated heat flux value at or proximate to the structural feature.

64. A machine accessible medium as defined in claim 62 having instructions stored thereon that, when executed, cause the machine to adjust the estimated heat flux value and determine another local temperature value and another estimated signal propagation time based on the adjusted estimated heat flux value when the signal propagation time does not substantially match the estimated signal propagation time.

65. A machine accessible medium as defined in claim 62, wherein the acoustic signal is an ultrasonic signal.

66. A machine accessible medium as defined in claim 62 having instructions stored thereon that, when executed, cause the machine to measure the signal propagation time of the acoustic signal emitted into the material based on emitting the acoustic signal using an ultrasonic transducer and detecting via the ultrasonic transducer an echo caused by the structural feature reflecting the acoustic signal.

67. A machine accessible medium as defined in claim 62, wherein the structural feature is one of an inner inaccessible surface of the material, a material layer interface, or a passageway feature in the material.

68. A machine accessible medium as defined in claim 62 having instructions stored thereon that, when executed, cause the machine to generate calibration data associating measured propagation times with corresponding temperature values collected by direct temperature measurements of the material, and determine the local temperature value based on the calibration data.

69. A machine accessible medium as defined in claim 62, wherein a heat source is directly applied to the structural feature of the material but not a surface of the material from which the acoustic signal is emitted into the material.

70. A machine accessible medium as defined in claim 62, wherein the material forms one of a fuel chamber or a gun barrel.

\* \* \* \* \*

UNITED STATES PATENT AND TRADEMARK OFFICE
CERTIFICATE OF CORRECTION

PATENT NO. : 8,256,953 B2  
APPLICATION NO. : 12/262758  
DATED : September 4, 2012  
INVENTOR(S) : Yuhas et al.

Page 1 of 1

It is certified that error appears in the above-identified patent and that said Letters Patent is hereby corrected as shown below:

Column 32, lines 2 and 3 (claim 6): replace "Thermocouple" with --thermocouple--

Signed and Sealed this  
Sixth Day of November, 2012

David J. Kappos  
*Director of the United States Patent and Trademark Office*